US011096325B2

(12) United States Patent
Song et al.

(10) Patent No.: US 11,096,325 B2
(45) Date of Patent: Aug. 24, 2021

(54) LAWN MOWER ROBOT

(71) Applicant: LG ELECTRONICS INC., Seoul (KR)

(72) Inventors: Hyunsup Song, Seoul (KR); Changhyeon Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 469 days.

(21) Appl. No.: 15/856,404

(22) Filed: Dec. 28, 2017

(65) Prior Publication Data
US 2018/0184585 A1   Jul. 5, 2018

(30) Foreign Application Priority Data

Jan. 2, 2017 (KR) .................. 10-2017-0000416

(51) Int. Cl.
A01D 34/00 (2006.01)
A01D 34/81 (2006.01)
A01D 34/74 (2006.01)
A01D 101/00 (2006.01)
A01D 34/73 (2006.01)
A01D 34/78 (2006.01)

(52) U.S. Cl.
CPC ........... A01D 34/008 (2013.01); A01D 34/74 (2013.01); A01D 34/81 (2013.01); A01D 34/73 (2013.01); A01D 34/78 (2013.01); A01D 2101/00 (2013.01)

(58) Field of Classification Search
CPC ..... A01D 34/008; A01D 34/81; G05D 1/0227
See application file for complete search history.

(56) References Cited

U.S. PATENT DOCUMENTS 3,924,389 A    12/1975  Kita
5,160,918 A  * 11/1992  Saposnik ............... G05G 9/047
                                                           273/148 B
(Continued)

FOREIGN PATENT DOCUMENTS

DE    212014000186       4/2016
EP       2425700 A2  *  3/2012  ............. H01H 3/168
(Continued)

OTHER PUBLICATIONS

Korean Notice of Allowance dated Oct. 10, 2018 issued in Application No. 10-2017-0000416.
(Continued)

Primary Examiner — Alicia Torres
(74) Attorney, Agent, or Firm — Ked & Associates LLP

(57) ABSTRACT

A lawn mower robot includes an inner body provided with casters and wheels for moving, a plurality of blades rotatably provided on a bottom surface of the inner body to cut grass, a drive motor mounted on the wheels, respectively, to independently drive the wheels, and an outer cover mounted on and configured to surround an outer side of the inner body to be movable in forward, backward, leftward and rightward directions with respect to the inner body when colliding with an obstacle. A plurality of ultrasonic sensors are provided to sense an obstacle, and an ultrasonic guide unit is formed to be recessed rearward from a front end portion of the outer cover so as to restrict a downward propagation angle of ultrasonic waves generated from the ultrasonic sensors.

20 Claims, 27 Drawing Sheets

(56) References Cited

U.S. PATENT DOCUMENTS

| | | | | |
|---|---|---|---|---|
| 5,831,554 A * | 11/1998 | Hedayat | ............... | G05G 9/047 |
| | | | | 341/20 |
| 10,440,879 B2 * | 10/2019 | Bjorn | ................ | B60L 50/66 |
| 2012/0023880 A1 | 2/2012 | Messina et al. | | |
| 2015/0366129 A1 * | 12/2015 | Borinato | ............... | B60L 53/60 |
| | | | | 701/25 |
| 2018/0107224 A1 * | 4/2018 | Bjorn | ................. | A01D 34/008 |
| 2018/0271014 A1 * | 9/2018 | Matsuzawa | ......... | A01D 34/826 |

FOREIGN PATENT DOCUMENTS

| | | |
|---|---|---|
| EP | 2 692 220 | 2/2014 |
| EP | 2 939 513 | 11/2015 |
| GB | 2 358 843 | 8/2001 |
| JP | 2005-040596 | 2/2005 |
| JP | 2016195545 | 11/2016 |
| KR | 10-2015-0125305 | 11/2015 |
| WO | WO 2013/125995 | 8/2013 |

OTHER PUBLICATIONS

European Search Report dated May 15, 2018 issued in Application No. 17209812.1.
Korean Office Action dated Feb. 24, 2018 issued in Application No. 10-2017-0000416.
NPL1—Technical manual—Husqvarna Automower HUSW2013_EUen_1155668-26 Dec. 31, 2013 (Husqvarna AB).
NL2—Spare parts list 25759530-dc8659-330x_2015 Jan. 31, 2015 (Husqvarna AB).
European Communication pursuant to Rule 114(2) EPC dated Oct. 23, 2020 issued in Application No. 17209812.1.

\* cited by examiner

LAWN MOWER ROBOT

CROSS-REFERENCE TO RELATED APPLICATION(S)

Pursuant to 35 U.S.C. § 119(a), this application claims the benefit of earlier filing date and right of priority to Korean Application No. 10-2017-0000416, filed on Jan. 2, 2017, the contents of which is incorporated by reference herein in its entirety.

BACKGROUND

1. Field

The present disclosure relates to a lawn mower robot provided with a safety device capable of sensing an obstacle in advance.

2. Background

A lawn mower is a device for trimming grass planted on the yard or playground at home. Such lawn mowers may be divided into household mowers for household use and tractor mowers for use on a large playground or farm.

For household lawn mowers, there exist walk-behind type mowers in which a person mows grass while directly pulling a lawn mower from behind and hand type lawn mowers in which a person carries a lawn mower by hand.

However, both types of lawn mowers require a user to directly operate the lawn mowers.

Especially, in a busy daily life, it is difficult for the user to directly operate the lawn mower to cut the lawn of the yard, and therefore, workers are mostly hired outside, resulting in employment costs.

Accordingly, automatic robot-type lawn mowers for preventing the occurrence of such additional costs and reducing the user's labor have been developed. Such an automatic robot-type lawn mower has a blade (knife edge) configured to rotate using a driving force of a motor at a lower portion of the main body to cut grass.

On the other hand, an automatic robot-type lawn mower has a wheel that rotates using an electric motor as a power source. In addition, a number of rotations of motors provided at both sides of a body of the lawn mower robot, respectively, may be controlled to manipulate a travelling direction of the robot.

However, the automatic robot-type lawn mower may be damaged when it collides with an obstacle during movement, and thus a safety device for preventing collision with the obstacle in advance is required.

In addition, the automatic robot-type lawn mower requires a safety device for mitigating an impact due to collision with an obstacle.

BRIEF DESCRIPTION OF THE DRAWINGS

The embodiments will be described in detail with reference to the following drawings in which like reference numerals refer to like elements wherein.

DETAILED DESCRIPTION

Hereinafter, a lawn mower robot associated with the present disclosure will be described in detail with reference to the accompanying drawings. A singular representation may include a plural representation as far as it represents a definitely different meaning from the context.

In describing the embodiments disclosed herein, moreover, the detailed description will be omitted when a specific description for publicly known technologies to which the invention pertains is judged to obscure the gist of the present invention.

Figure 1:
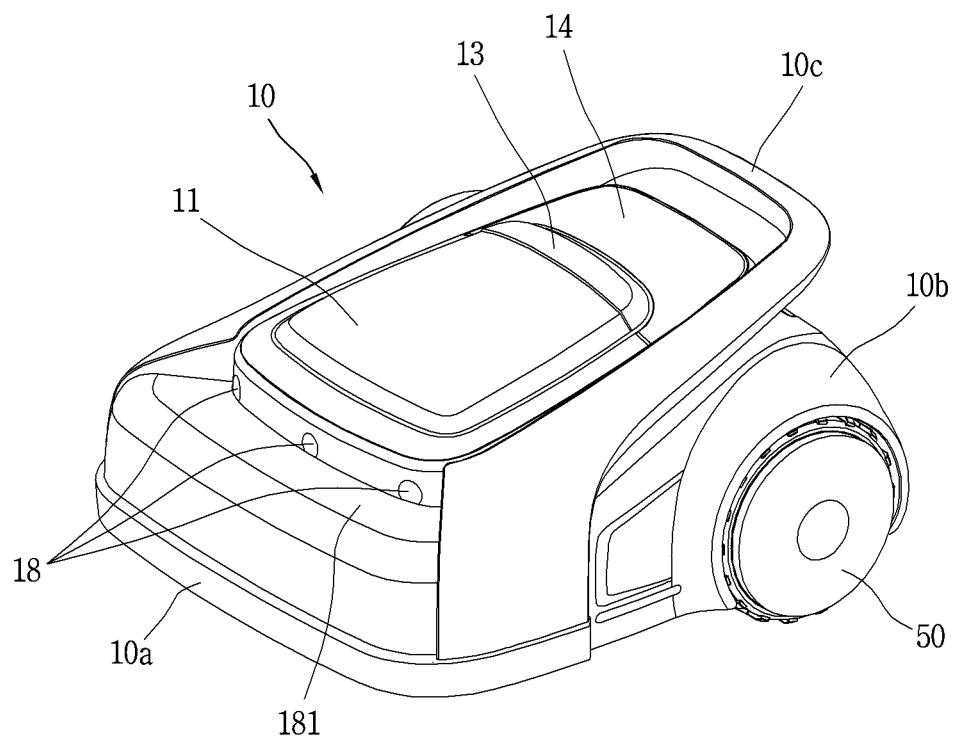
FIG. 1 is a perspective view illustrating an appearance of a lawn mower robot according to the present disclosure.
Figure 2:
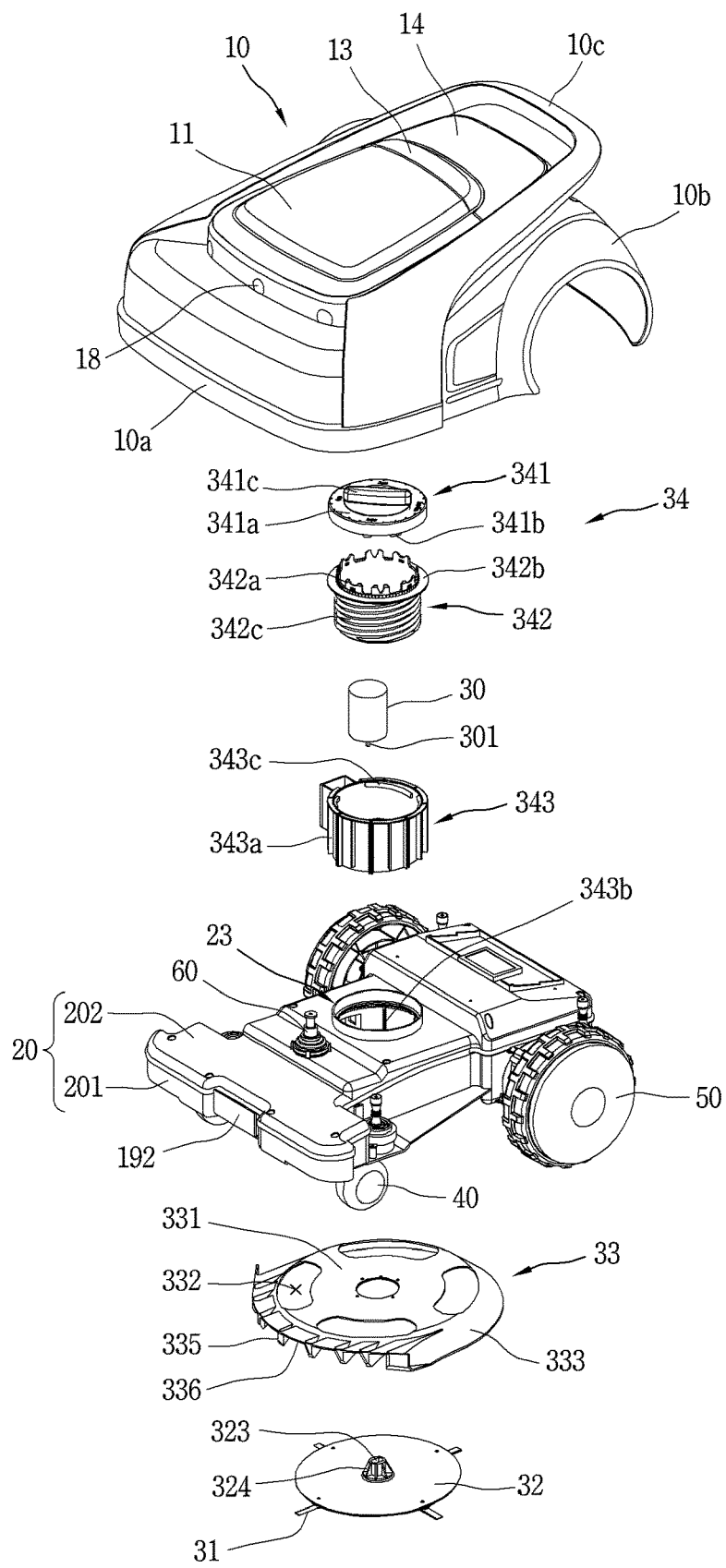
FIG. 2 is an exploded perspective view of FIG. 1.
Figure 3:
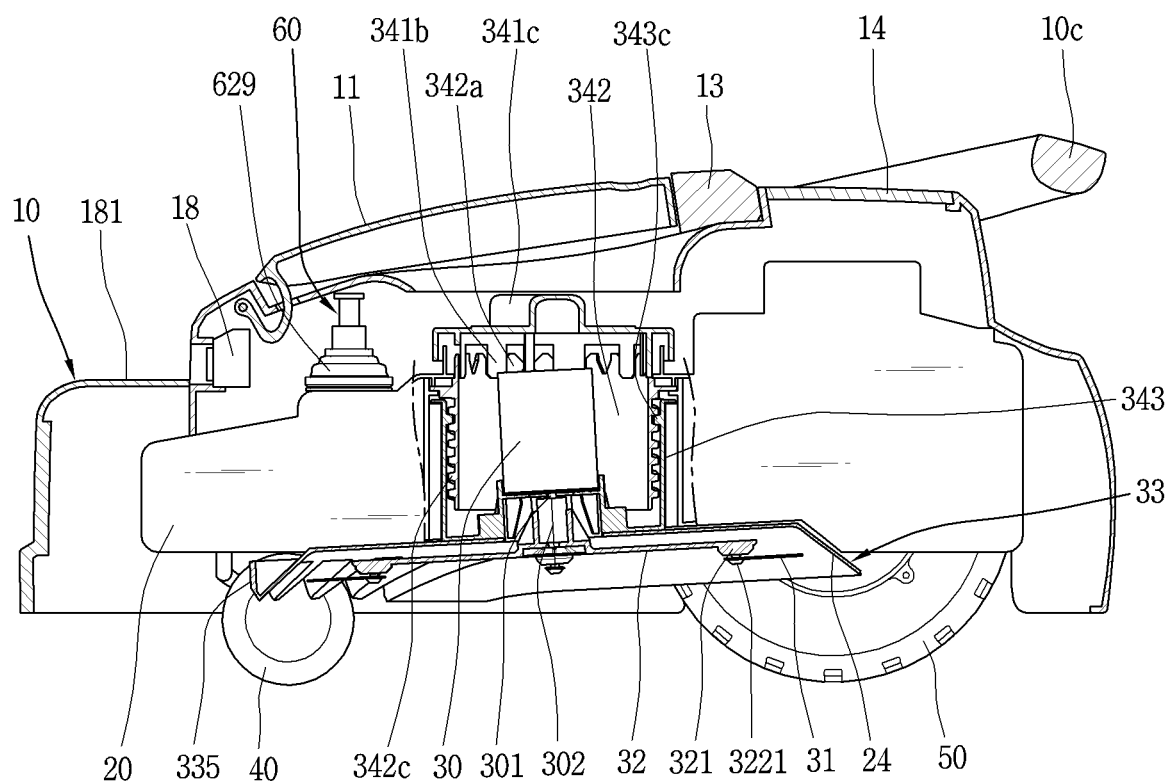
FIG. 3 is a side cross-sectional view of FIG. 1.

FIG. 1 is a perspective view illustrating an appearance of a lawn mower robot according to the present disclosure, and FIG. 2 is an exploded perspective view of FIG. 1, and FIG. 3 is a side cross-sectional view of FIG. 1.

The lawn mower robot may be largely configured with an outer cover 10 and an inner body 20.

The outer cover 10 is configured to surround an outer side of the inner body 20 and forms an outer appearance of the robot. The outer cover 10 is a structure for preventing a person's hand or foot from entering an inside of the outer cover 10 in order to protect him or her from an impact due to the rotation of the blade 31 because the blade 31 rotating at a high speed is mounted thereon. A lower end portion of the outer cover 10 should be disposed to be spaced apart at a preset height in accordance with safety standards. It is because when a lower end portion of the outer cover 10 is disposed too high from the ground, a person's hand or foot may enter the inside from the outside and cause a fatal injury, and when the outer cover 10 is disposed too low from the ground, the load may increase when mowing grass.

The outer cover 10 includes a bumper portion 10a capable of colliding with an obstacle at the front and a fender portion 10b forming a curved surface to mount wheels 50 at the rear on both side surfaces thereof. The bumper portion 10a surrounds a front end portion and a front side portion of the outer cover 10 and is thicker than the other portions. The fender portion 10b is configured to surround an outer surface of the wheel 50 and the width of the vehicle is wider than elsewhere.

A carry handle 10c may be provided at an upper portion of the outer cover 10. The carry handle 10c may be configured such that both sides of the outer cover 10 are respectively formed to be inclined upward from a side front upper portion of the outer cover 10 to the rear side, and a rear end portion thereof is protruded to a rear upper portion of the outer cover to form a closed curved surface. The carry handle 10c may be formed, for example, in a "U" shape. The carry handle 10c having such a structure allows the blade 31 located on a bottom surface of the inner body 20 to face an outside of the user when the carry handle 10c is lifted for the user's safety during transportation.

The outer cover 10 may be disposed at an upper portion of the inner body 20 such that the front and rear surfaces and left and right side surfaces thereof are spaced apart from the inner body 20 in the front, rear, left, and right directions, thereby absorbing an impact from an obstacle.

A first cover 11 and a second cover 14 may be disposed at an upper portion of the outer cover 10 to be spaced apart from each other in a front-rear direction, and an emergency stop switch 13 may be provided between the first cover 11 and the second cover 14. The emergency stop switch 13 may be protruded higher than the other portions of the outer cover 10 except for the carry handle 10c, thereby having an advantage of facilitating the user's operation. The emergency stop switch 13 is disposed at a rear side of the outer cover 10, and configured to allow the user to operate the rear cover 10 from the rear side of the outer cover 10 in consideration of the user's safety in an emergency.

An ultrasonic sensor 18 may be provided at a front side of the outer cover 10. The ultrasonic sensor 18 may be configured to sense an obstacle in the front to reduce a driving speed of the wheels 50.

The inner body 20 serves as a main body of the robot.

The caster 40 may be mounted on a front bottom surface of the inner body 20 to be pivotable through 360 degrees about the rotation shaft so that the driving direction of the robot can be controlled in the left and right direction according to a pivot angle of the caster 40.

The wheels 50 are rotatably mounted on both the rear side surfaces of the inner body 20, respectively, to drive the robot. The wheels 50 rotate using a drive motor as a power source to move the robot forward or backward.

A plurality of blades 31 are rotatably provided on a bottom surface of the inner body 20, and the plurality of blades 31 rotate to cut down grass.

The plurality of blades 31 are rotatably mounted at an edge portion of the rotating plate 32. The plurality of blades 31 may be spaced apart at regular intervals along a circumferential direction of the rotating plate 32. The plurality of blades 31 may be configured with four blades. The four blades 31 may face each other in the radial direction and arranged at intervals of 90 degrees in the circumferential direction. A number of the blades 31 is related to a driving speed of the lawn mower robot and a rotational speed (RPM) of the blades 31. For example, when the number of the blades 31 is four, a rotational speed of the blades 31 may be reduced while driving at a higher driving speed than in the case of three blades with the same grass cutting quality.

Each of the plurality of blades 31 may be fastened to the rotating plate 32 with a bolt 3221. Each of the plurality of blades 31 is formed with a fastening hole 311 at one end portion thereof, and the bolt 3221 may be coupled thereto through the fastening hole 311. Each of the plurality of blades 31 may rotate about the bolt 3221 at the other end portion thereof.

Each of the plurality of blades 31 may be unfolded in a radial direction by a centrifugal force when the rotating plate 32 rotates, and the blade 31 may be folded toward the center of the circle when the rotating plate 32 stops.

As a result, the blade 31 may be configured to be folded when it receives an impact from a stone or the like stuck in the ground. The blade 31 must satisfy an amount of impact (kinetic energy) according to safety standards, for example, 2 J. When the blade 31 is not folded even when the amount of impact is 2 J or more according to the safety standards, either one of the blade 31 and the stone may be broken and broken pieces may be thrown out of the outer cover 10 to cause injuries to workers in the vicinity. Therefore, in order to solve the above-described problem, the blade 31 may be preferably folded at an amount of impact less than that of the safety standards.

Figure 4:
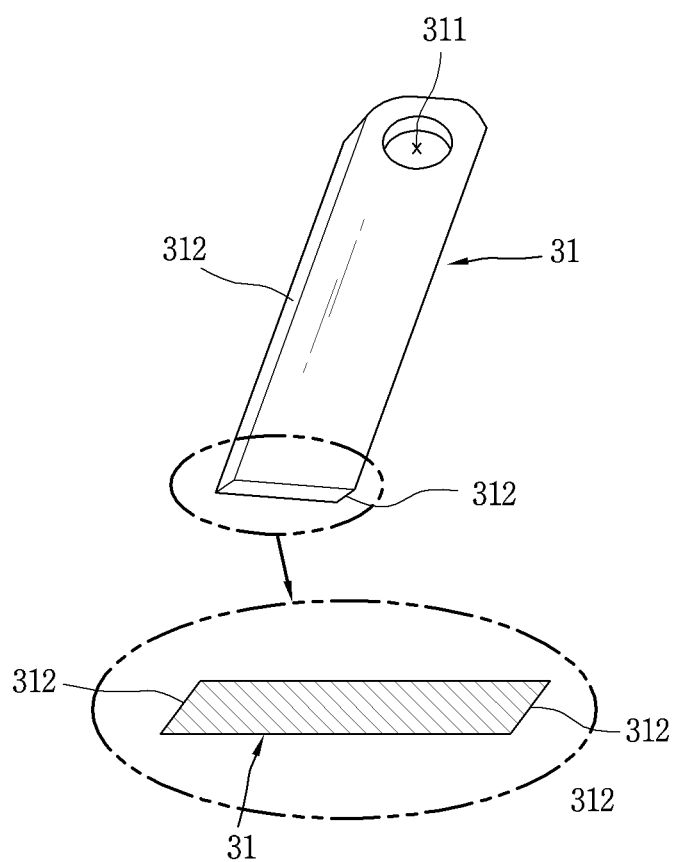
FIG. 4 is a conceptual view illustrating a blade in FIG. 2 and a cross-sectional shape thereof.
Figure 5:
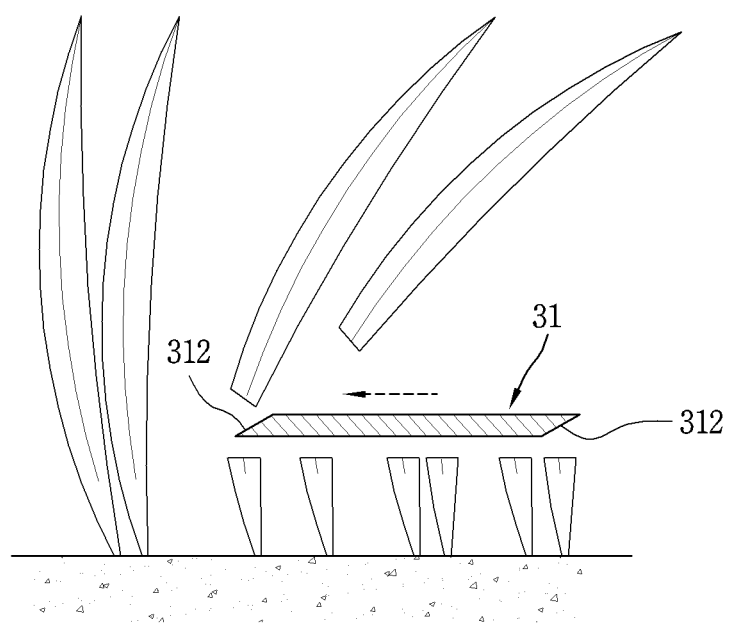
FIG. 5 is a conceptual view illustrating a state in which a blade in FIG. 4 mows grass.
Figure 6:
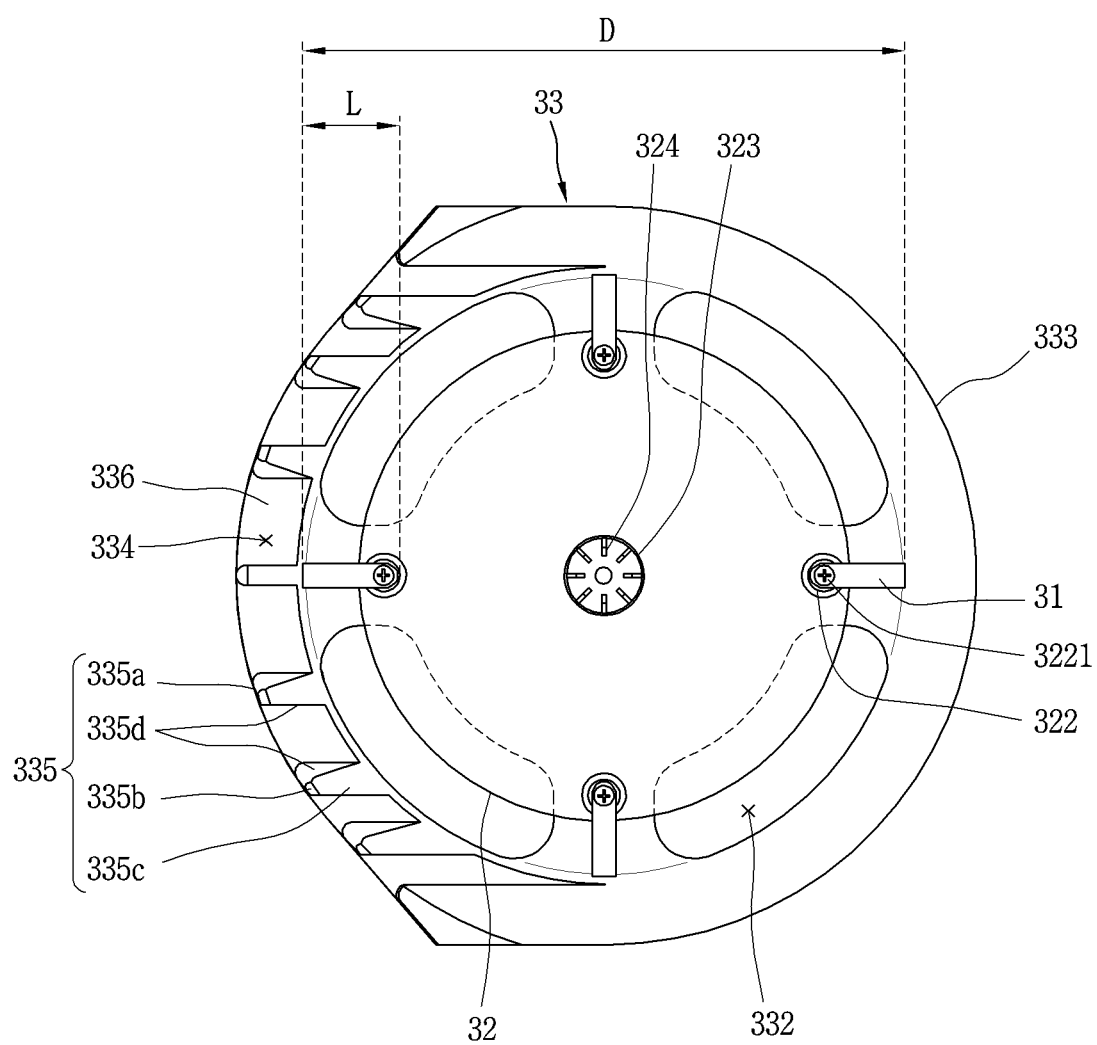
FIG. 6 is a bottom view illustrating a blade in FIG. 5 mounted on a rotating plate.

FIG. 4 is a conceptual view illustrating the blade 31 of FIG. 2 and a cross-sectional shape thereof, and FIG. 5 is a conceptual view illustrating a state in which the blade 31 of FIG. 4 cuts grass, and FIG. 6 is a bottom view illustrating the blade of FIG. 5 mounted on the rotating plate 32.

The blade 31 is very important to improve the quality of grass cutting. The blade 31 according to the present disclosure may be formed in a rectangular plate shape having a long length, a narrow width, and a uniform thickness. The blade 31 according to the present disclosure is made to have a constant width along a length direction thereof. A width of the blade 31 may be constant to have a uniform strength of the blade 31 along the length direction, thereby improving durability.

A fastening hole 311 for fastening the bolt 3221 is formed at one end portion of the blade 31. One end portion of the blade 31 may be formed in a circular shape. The blade 31 cuts grass while rotating in a circumferential direction of the rotating plate 32. At this time, the blade 31 is made to cut only in a single rotational direction.

It is preferable that cutting portions 312 are formed on both side surfaces of the blade 31, respectively, and the cross-sectional shape of the blade 31 is a parallelogram. In addition, it is preferable that a bottom surface of the cutting portion 312 is horizontal and an inclined surface of the cutting portion 312 is disposed to face upward.

If a horizontal surface of the cutting portion 312 faces upward and an inclined surface of the cutting portion 312 faces downward, then an upper portion of the grass is first cut while being in contact with an end of the horizontal surface end of the cutting portion 312 and a lower portion of the grass is cut, thereby causing a problem that the cut surface of the grass is not smooth.

The reason why the cutting portion 312 is provided on both side surfaces of the blade 31 is that cutting can be carried out in the same direction even when the top and bottom surfaces of the blade 31 are reversed from each other.

The blade 31 preferably satisfies the following conditions in order to have a good grass cutting quality while satisfying an amount of impact according to the safety standards, 2 J or less.

A length (L) of one of the blade 31 is preferably within a range of D/9 to D/6 compared to a rotation diameter (D) of a circle formed by the plurality of the blades 31. The rotation diameter (D) of the blade 31 refers to a diameter between outer ends of the two blades 31 facing each other in a radial direction of the rotating plate 32 when the blade 31 is unfolded as illustrated in FIG. 6. As the lawn mower robot drives, grass within the rotation diameter of the blade 31 is cut by the rotating blade 31.

A thickness of the blade 31 is preferably 0.75 to 1.25 mm.

A width of the blade 31 is preferably 7.5 to 12.5 mm.

It is because there is a problem in which when the length, thickness, and width of the blade 31 are excessively larger than the upper limit values, an impact amount condition according to the safety standards is not satisfied, and when they are too small, the cutting quality of the grass is deteriorated. According to the thickness and width of the blade 31 within the numerical range, the blade 31 is not broken while satisfying the conditions of the impact amount of the safety standards or less, the reduction of the rotational speed of the blade 31 is small and the rotation load is low.

The rotational speed of the blade 31 is preferably 2250 to 2750 rpm. It is because there is a problem in which when the rotational speed of the blade 31 is excessively high, an amount of impact (kinetic energy) according to the safety standards is exceeded, and when it is excessively slow, the cutting quality of the grass is deteriorated.

The rotating plate 32 is a component in which a plurality of blades 31 are mounted to rotate the blades 31. The rotating plate 32 is rotatably mounted on a bottom surface of the inner body 20. A drive motor for rotating the rotating plate 32 may be provided within the inner body 20, and the drive motor 30 may be connected to a center portion of the rotating plate 32 through the rotation shaft 301 to rotate the rotating plate 32.

A receiving portion 23 for receiving the blade drive motor 30 may be formed at a central portion of the inner body 20. The receiving portion 23 is formed in a cylindrical tube shape that is formed from the bottom to the top of the inner body 20.

The rotating plate 32 is preferably disposed to be inclined downward with respect to a horizontal plane in the advancing direction of the inner body 20. The blade 31 mounted on the rotating plate 32 is also disposed in parallel to the rotating plate 32 and inclined downward with respect to the horizontal plane. According to this, a front end portion of the blade 31 is positioned lower than a rear end portion of the blade 31 (a portion where the fastening hole 311 of the bolt 3221 is formed) to lower a height of the grass cut by the blade 31 as it goes to the front, thereby reducing a rotational load of the blade 31.

A protruding portion 321 is formed directly below an edge bottom surface of the rotating plate 32, and a chamfered portion 322 formed to have a smaller diameter as it goes to downward from a lower end of the protruding portion 321 is formed. The bolt 3221 is fastened to the chamfered portion 322 and the protruding portion 321 through the fastening hole 311 of the blade 31 so that a bolt head and the chamfered portion 322 are spaced apart from each other by a predetermined distance. A diameter of the chamfered portion 322 and the bolt head is larger than that of the stem portion of the bolt 3221 and the fastening hole 311 of the blade 31 so that the upward and downward movement of the blade 31 along the stem portion of the bolt 3221 is limited. As a result, the blade 31 is disposed to be spaced apart from the rotating plate 32 in a downward direction by the protruding portion 321 and the chamfered portion 322. The other end portion of the blade 31 is rotatable about the bolt 3221 and may be unfolded out of the rotating plate 32 or folded into the rotating plate 32. Here, the blade 31 may rotate while being spaced apart from the rotating plate 32 in a downward direction by the protruding portion 321 and the chamfered portion 322, thereby avoiding interference between the rotating plate 32 and the blade 31 even when the blade 31 is bent while the blade 31 is unfolded or folded.

A distance between the blade 31 and the outer cover 10 should be maintained at a predetermined distance, for example, 12 cm or more, according to the safety standards.

Figure 7A:
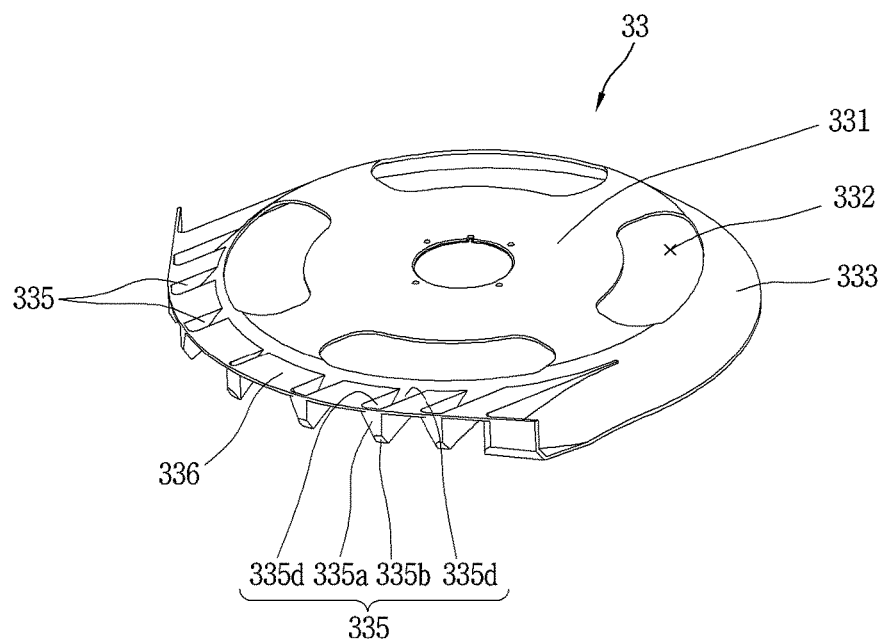
FIG. 7A is a perspective view illustrating a blade protection cover in FIG. 6.
Figure 7B:
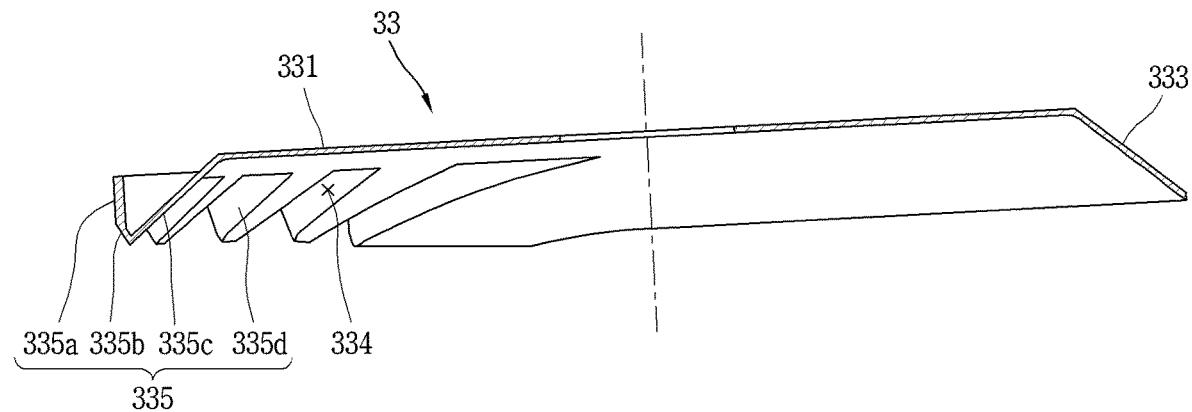
FIG. 7B is a side cross-sectional view of FIG. 7A.
Figure 8:
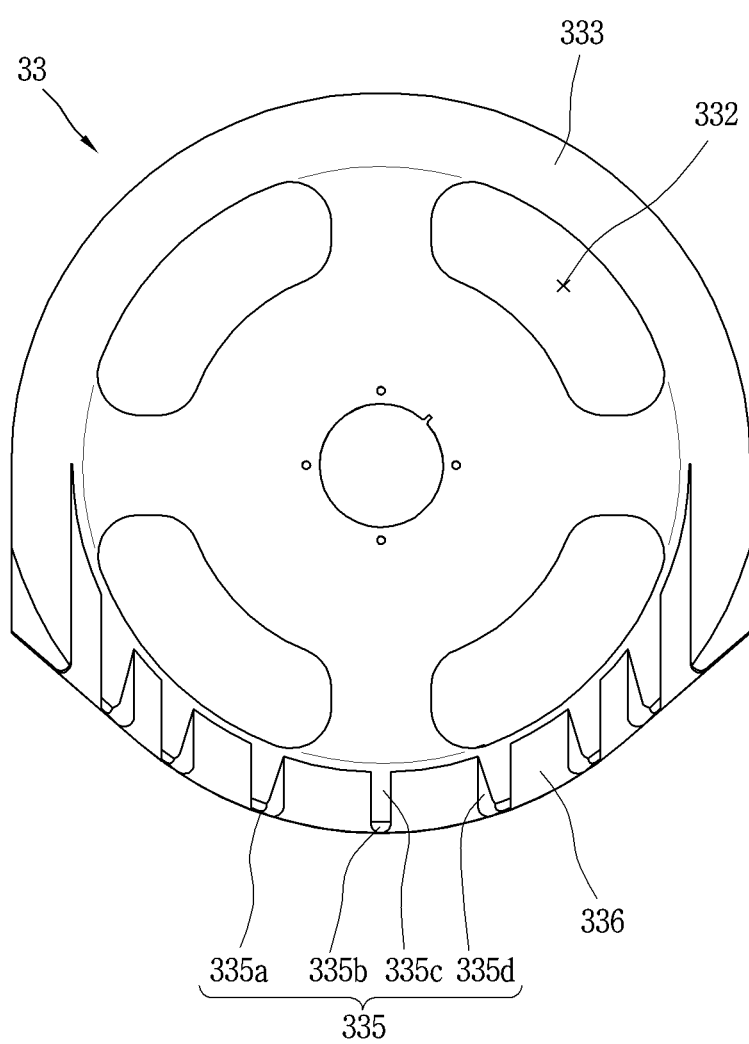
FIG. 8 is a bottom view of FIG. 7A.

FIG. 7A is a perspective view illustrating a blade protection cover in FIG. 6, and FIG. 7B is a side cross-sectional view of FIG. 7A, and FIG. 8 is a bottom view of FIG. 7A.

The blade protection cover 33 is configured to surround the blade 31. The protection cover of the blade 31 is disposed between the blade 31 and the outer cover 10 to minimize an obstacle such as a stone from being directly thrown out of the outer cover 10 while colliding with the blade 31.

The blade protection cover 33 is spaced apart from the blade 31 at regular intervals.

The blade protection cover 33 may be configured to include a blade protection cover body 331, a tapered portion 333, and a plurality of protrusion portions 335.

The blade protection cover body 331 may be formed in a circular plate shape to have a larger diameter than the rotating plate 32. A through hole 332 may be formed along an edge of the blade protection cover body 331 with a constant curvature. The blade protection cover body 331 is disposed between the rotating plate 32 and a bottom surface of the inner body 20. At this time, the through holes 332 may be arranged to overlap with the edge portions of the rotating plate 32 and the blades 31 in a height direction. The through holes 332 may be arranged to overlap with the bottom surface of the inner body 20 in a height direction. As a result, a fragment of an obstacle (or foreign object) such as a stone caused by the collision with the blade 31 may be reflected to the ground after bumping against a bottom surface of the inner body 20 through the through hole 332. If the fragment is not discharged out of the blade protection cover 33 through the through hole 332, then the fragment may be scattered within the blade protection cover 33 several times and be thrown out of the outer cover 10.

The tapered portion 333 is formed to be inclined downward along a circumferential direction at a edge portion of the blade protection cover body 331 and disposed to surround the blade 31. The fragment generated by the collision with the blade 31 is reflected to the ground by the tapered portion 333 without being immediately thrown out of the outer cover 10. A lower end of the edge portion may be formed to have a lower height than the blade 31 from the ground.

However, when the height of the tapered portion 333 is excessively low, the tapered portion 333 may further block fragments such as stones or the like from being thrown out to the outside, but the tapered portion 333 may be in contact with the grass or the like, thereby increasing load during the movement of the robot. On the contrary, when the height of the tapered portion 333 is excessively high, load at the time of moving the lawn mower robot may be reduced, but there is a problem that the possibility in which fragments such as stones or the like is thrown out increases. Therefore, it is required to appropriately adjust the height of the blade protection cover 33.

When the tapered portion 333 is formed in front of the blade protection cover 33, grass having a long length before the cutting operation of the lawn mower robot may be caught by a front end of the blade protection cover 33, thereby making it difficult to enter the blade 31. Moreover, the grass forcibly entered into the blade protection cover 33 may laid down below the blade 31, thereby making it difficult to cut the grass to a desired height.

Therefore, the tapered portions 333 are preferably formed at both sides and rear a rear side of the blade protection cover 33.

In addition, a grass inlet 334 formed in front of the blade protection cover 33 to have a height higher than that of the blade 31 so as to ensure entry into the blade 31 is provided to secure an entry path of the grass.

On the other hand, when the grass inlet 334 is fully open, the entry of grass may be efficiently maintained, but it may be impossible to prevent fragments from being thrown out in upward and lateral directions due to a collision with the blade 31 within the grass inlet 334.

According to the present disclosure, a plurality of protrusion portions 335 capable of preventing fragments from being thrown out in upward and lateral directions due to a collision with the blade 31 in the grass inlet 334 as well as allowing the grass to efficiently enter the blade 31 through the grass inlet 334 are provided on the blade protection cover 33.

The plurality of protrusion portions 335 are disposed to be spaced apart from each other in an arc shape at a front side of the blade protection cover body 331. Each of the plurality of protrusion portions 335 may be formed in a rectangular cross-sectional shape having a three-step bending structure.

Describing a rectangular cross-sectional shape having a three-step bending structure in the protrusion portions 335 in detail, each of the protrusion portions 335 may be formed to include a front surface 335a, a first inclined surface 335b, and a second inclined surface 335c, from a front side of the blade protection cover 33. The front surface 335a is formed in a vertical direction in front of the blade protection cover body 331. The first inclined surface 335b forms a lower portion of the protrusion portion 335, and is formed to be inclined downward from a lower end of the front surface 335a. The second inclined surface 335c forms a rear surface of the protrusion portion 335, and is formed to be inclined upward from a lower end of the first inclined surface 335b toward the rear side. The protrusion portion 335 is formed to have a larger width from the front surface 335a toward the second inclined surface 335c and a narrower area from an upper portion of the protrusion portion 335 toward the downward direction. The second inclined face 335c may be larger in area than the front surface 335a to reflect more fragments generated due to a collision with the blade 31 to the ground. An area of the front surface 335a may be smaller than that of the second inclined surface 335c of the protrusion portion 335 and the area may become narrower toward the downward direction of the protrusion portion 335, thereby securing a larger area of the grass inlet 334.

Furthermore, the protrusion portion 335 has side surface portions 335d which are laterally disposed to face each other on both side surfaces thereof. The side surface portion 335d is connected to the front surface 335a, and the first and second inclined surfaces 335c of the protrusion portion 335 to prevent fragments from being thrown out laterally due to a collision with the blade 31.

The protrusion portion 335 includes a connecting rib 336 extended forward from a front side of the blade protection cover body 331 to connect the front surface 335a and the side surface 335d. The connecting rib 336 may prevent fragments from being thrown out in an upward direction due to a collision with the blade 31.

A plurality of protrusion portions 335 are arranged such that intervals between the protrusion portions 335 toward the both side end portions of the grass inlet 334 become gradually narrower with respect to a longitudinal center line of the protection cover. If the plurality of protrusion portions 335 are arranged at regular intervals on an arc, an anteroposterior distance between the protrusion portions 335 may become larger toward the both side end portions of the grass inlet 334 than the center portion thereof, thereby causing a problem that fragments are thrown out through the anteroposterior distance between the protrusion portions 335. However, according to the arrangement of the protrusion portions 335 of the present disclosure, the plurality of protrusion portions 335 may be disposed laterally to overlap at the grass inlet 334, thereby preventing fragments from being thrown out in a lateral direction due to a collision with the blade 31 rotating at the grass inlet 334.

The protrusion portion 335 located at the center of the plurality of protrusion portions 335 may be formed to have a smaller width than the other protrusion portions 335 to minimize collision with the grass.

The blade protection cover 33 is formed to be inclined at an angle of, for example, three degrees with respect to the horizontal plane so that the height of the protrusion portions 335 can be arranged lower than the rear surface of the tapered portion. At this time, the rear surface of the tapered portion 333 may be extended in a more elongated manner than the protrusion portion 335 in the downward direction from the blade protection cover body 331 in order to prevent fragments from being thrown out to the maximum extent.

A height adjusting unit may be provided on the blade protection cover body 331, and configured to adjust the height of the blade protection cover 33 together with the blade 31 and the rotating plate 32 according to the height of the grass cutting.

In order to minimize a resistance due to a collision with the grass while driving the robot and prevent fragments such as stones or the like caused by a collision with the blades 31 from being thrown out of the outer cover 10 to the utmost, the blade protection cover 33 may be required to appropriately adjust the height of the blade protection cover 33 and the blade 31 according to the height of the grass cutting.

The rear surface of the tapered portion 333 may be disposed lower than a rear lower end portion of the outer cover 10 when the height of the blade protection cover 33 is adjusted to the lowest level, thereby minimizing fragments generated due to a collision with the blade 31 from being thrown out of the rear side of the outer cover 10.

Here, since the blade protection cover 33 may have a structure of moving together with the blade 31, when the height of the blade 31 is determined, the height of the blade protection cover 33 may be determined at the same time. However, it may be configured such that the height of the blade protection cover 33 and the height of the rotating plate 32 of the blade 31 are independently adjusted.

Figure 9:
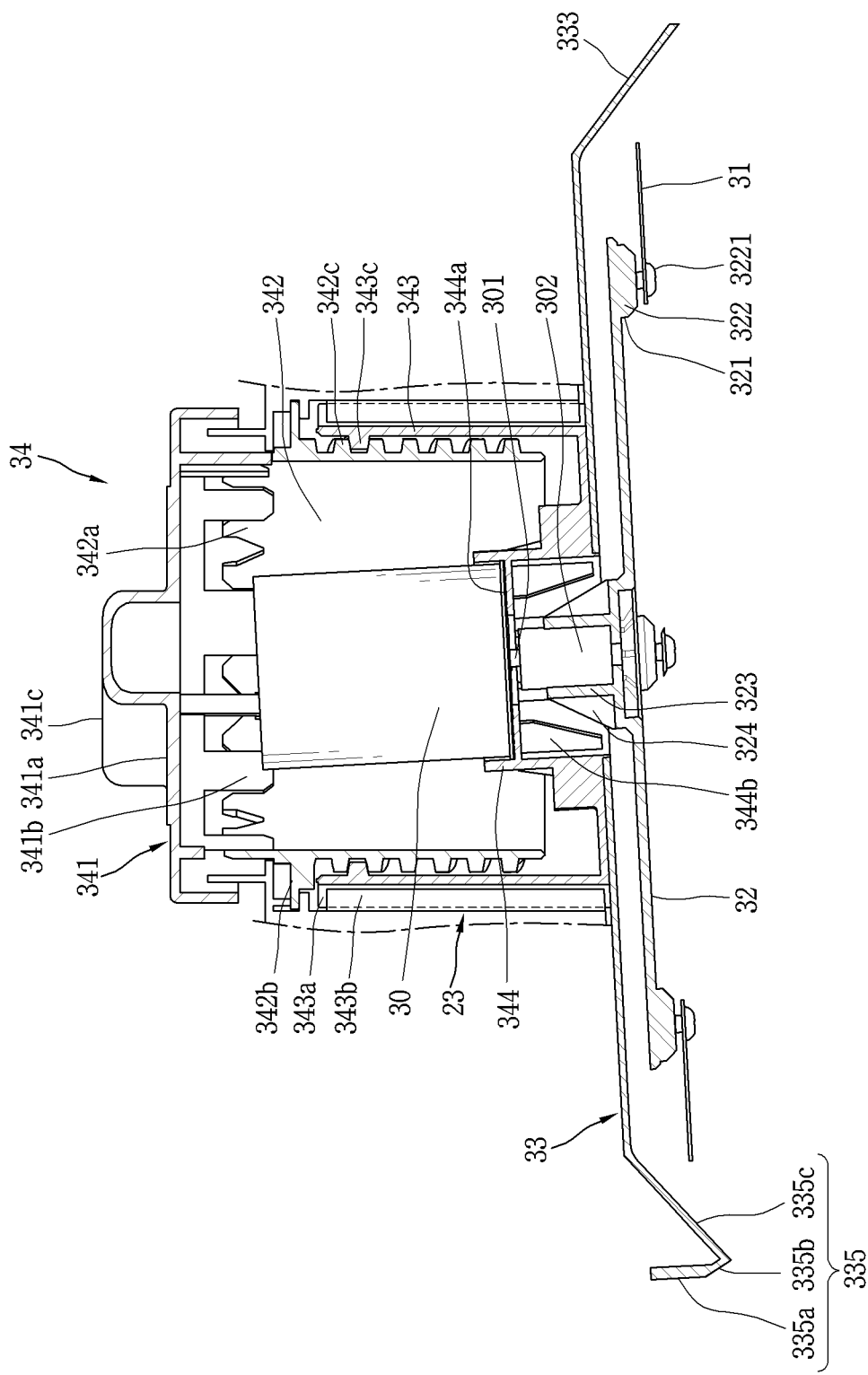
FIG. 9 is a cross-sectional view illustrating a coupling structure of a height adjusting unit in FIG. 3.
Figure 10:
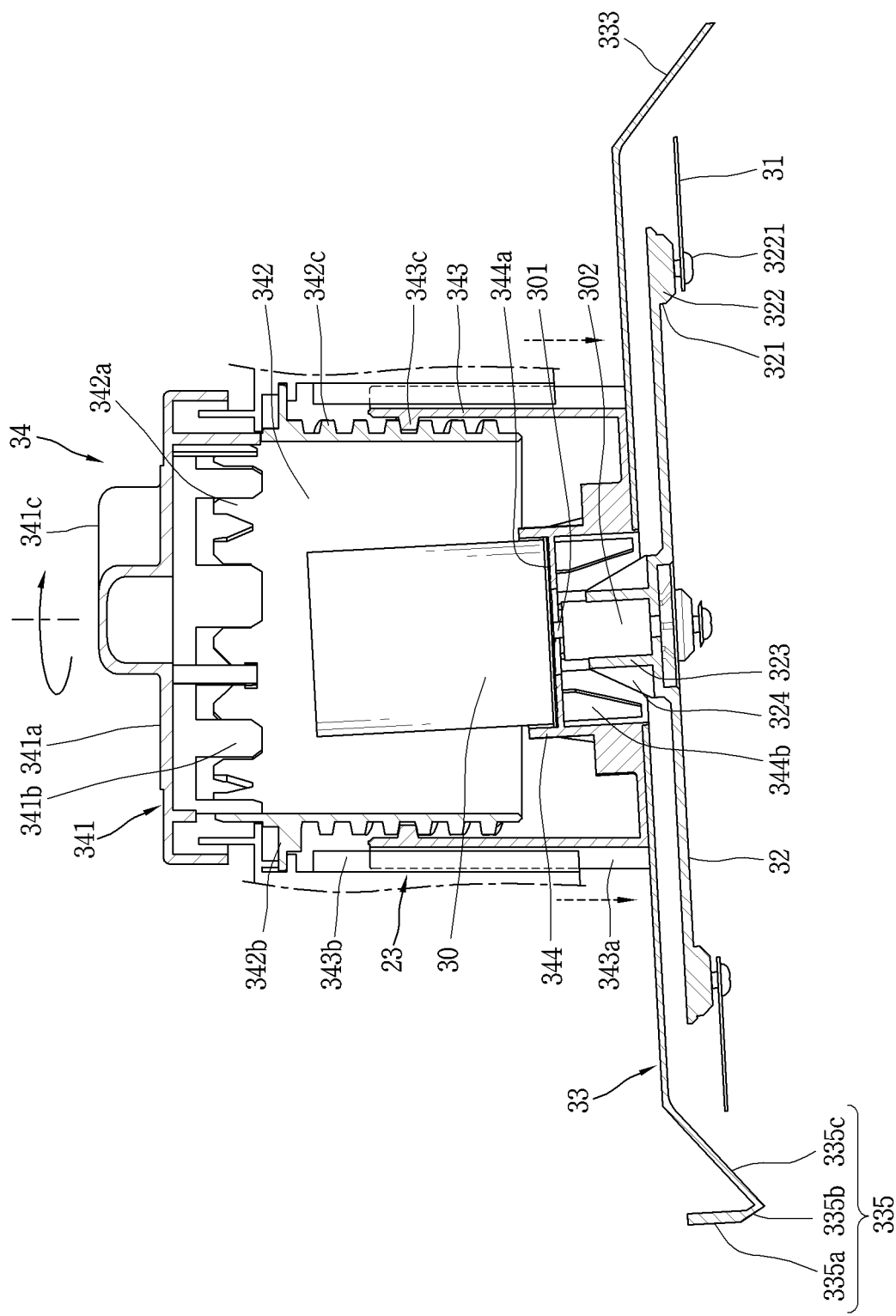
FIG. 10 is a conceptual view illustrating a state in which a blade protection cover is lowered by the operation of the height adjusting unit in FIG. 9.

FIG. 9 is a cross-sectional view illustrating a coupling structure of a height adjusting unit 34 in FIG. 3, and FIG. 10 is a conceptual view illustrating a state in which the blade protection cover 33 is lowered by the operation of the height adjusting unit 34 in FIG. 9.

The height adjusting unit includes a height adjusting lever 341, a rotating cylindrical portion 342, and a lifting frame 343.

The height adjusting lever 341 is rotatably mounted on an upper portion of the receiving portion 23 of the inner body 20. The height adjusting lever 341 may include a lever body 341a formed in a circular shape and a handle portion 341c protruding from an upper portion of the lever body 341a.

A rotation guide protrusion portion 342c is formed downward at an edge portion of the lever body 341a, and the rotation guide protrusion portion 342c is mounted on the receiving portion 23 in such a manner as to surround an upper end of the receiving portion 23. The lever body 341a is restricted from being released from the receiving portion 23 of the inner body 20 by the rotation guide protrusion portion 342c when the lever body 341a is rotated while being arranged to cover an upper portion of the receiving portion 23.

A scale may be displayed on an upper surface of the lever body 341a so that the user can recognize the height of the blade 31, and a triangular-shaped indicator 341d may be displayed on an upper portion of the receiving portion 23. As a result, the user may recognize the height of the blade 31 by reading the scale indicated by the indicator 341d.

The handle portion 341c may protrude in a radial direction across an upper center of the lever body 341a, and the user may manually rotate the handle portion 341c.

A plurality of rotating protrusion portions 341a may protrude at a lower inner side of the lever body 341a to be spaced apart in a circumferential direction to perform the role of transmitting a rotational force by manual operation of the handle portion 341c to the rotating cylindrical portion 342.

A plurality of coupling protrusions 342a are disposed apart from each other in a circumferential direction at an upper end portion of the rotating cylindrical portion 342. Each of the plurality of coupling protrusions 342a may be engaged and coupled to the rotating protrusion portion 341a of the lever body 341a so that the rotating cylindrical portion 342 can receive a rotational force from the height adjusting lever 341.

A lowering restriction protrusion 342b may protrude in a circumferential direction on an outer surface of an upper end portion of the rotating cylindrical portion 342 to have a larger diameter than the receiving portion 23, and the lowering restriction protrusion 342b may be engaged with an upper end of the receiving portion 23, thereby restricting the rotating cylindrical portion 342 from being lowered.

The rotation cylindrical portion 342 may be formed in a cylindrical tube shape, and the rotation guide protrusion 342c may be formed in a spiral direction along an outer circumferential surface of the rotating cylindrical portion 342, and the rotation guide protrusion 342c may be tooth-coupled with a spiral protrusion 343c of the lifting frame 343a to guide the vertical movement of the lifting frame 343.

The lifting frame 343 is formed in a cylindrical shape and mounted to be movable in a vertical direction within the receiving portion 23 of the inner body 20. A plurality of rotation restricting protrusions 343a are spaced apart in a circumferential direction on an outer circumferential surface of the lifting frame 343, and each of the plurality of rotation restricting protrusions 343a extends in a vertical direction.

A plurality of rotation preventing receiving grooves 343b may be formed within the receiving portion 23, and the rotation restricting protrusions 343a may be respectively received in the plurality of rotation preventing receiving grooves 343b, thereby moving upward and downward while restricting the rotation of the lifting frame 343.

The spiral protrusion 343c may be formed along a spiral direction at an upper end portion of an inner circumferential surface of the lifting frame 343 to guide the rotation of the rotating cylindrical portion 342. A pair of the spiral protrusions 343c may be disposed on an inner circumferential surface of the lifting frame to be spaced apart from each other in a radial direction.

A mounting portion 344 for mounting a driving motor is provided within the lifting frame 343. The drive motor is used as a power source for driving the blade 31. The mounting portion 344 is formed to protrude from a bottom surface of the lifting frame 343 to an inner space thereof.

A cylindrical hollow hole is formed within the mounting portion 344, and a partition wall 344a is formed at an inner upper side of the mounting portion 344 to cross the hollow hole in a radial direction. A motor receiving groove is formed at an upper portion of the mounting portion 344 by the partition wall 344a, and the drive motor is fixed in a state of being received in the motor receiving groove of the mounting portion 344 to restrict the downward and lateral movement of the driving motor. A recess portion is formed at a lower portion of the mounting portion 344 by the partition wall 344a. The rotation shaft 301 of the drive motor 30 is disposed toward a center portion of the rotating plate 32 and protrudes into the recess portion through an insertion hole formed on the partition wall 344a. A plurality of reinforcing ribs 344b may be arranged on an inner circumferential surface of the recess portion to be spaced apart in a circumferential direction, and each of the plurality of reinforcing ribs 344b may connect an inner circumferential surface of the recess portion 344a with the partition wall 344a, thereby increasing strength for supporting the drive motor.

A coupler 302 may be coupled to an outside of the rotation shaft 301 of the drive motor 30. The coupler 302 may surround the rotation shaft, and a circumferential surface thereof may be configured in an elliptically curved shape to transmit a rotational force of the rotation shaft 301 to the rotating plate 32.

A shaft coupling portion 323 is protruded from an upper center portion of the rotating plate 32. A coupler receiving groove may be formed in an elliptically curved shape corresponding to an outer circumferential surface of the coupler 302 within the shaft coupling portion 323 to couple the shaft coupling portion 323 to the coupler 302. The coupler 302 and the shaft coupling portion 323 may be received in the recess portion. A plurality of reinforcing ribs 324 may be arranged on an outer circumferential surface of the shaft coupling portion 323 along a circumferential direction, and each of the plurality of reinforcing ribs 324 may connect an outer circumferential surface of the shaft coupling portion 323 to a center portion of the rotating plate 32, thereby increase a coupling strength between the shaft coupling portion 323 and the rotating plate 32. A bolt is fastened to the coupler 302 through a center portion of the rotating plate 32 to couple the rotating plate 32 to the coupler 302. As a result, a rotational force generated from the drive motor 30 may be transmitted to the rotating plate 32 through the coupler 302 and the shaft coupling portion 323 from the rotation shaft 301 to rotate the rotating plate 32.

The driving motor mounted on the mounting portion 344 of the lifting frame 343 may move upward and downward together with the lifting frame 343.

The mounting portion 344 is formed to be inclined at a predetermined angle, for example, 3 degrees, in a forward direction of the inner body 20 with respect to a vertical center line of the receiving portion 23, and the rotation shaft of the drive motor 30 mounted on the mounting portion 344 is disposed to be inclined at an angle with respect to the vertical center line of the receiving portion 23.

A lower end portion of the lifting frame 343 is vertically fastened to an upper center of the blade protection cover 33. At this time, the blade protection cover 33 is disposed to be inclined at a predetermined angle toward the front with respect to the horizontal plane similarly to the rotating plate 32 and the blade 31. Furthermore, a lower end portion of the lifting frame 343 may be inclined to correspond to an inclination angle of the blade protection cover 33.

A depression portion 24 may be formed in a shape corresponding to a shape of the blade protection cover 33 on a bottom surface of the inner body 20, and an upper surface of the blade protection cover 33 may be received in and abutted against the depression 24 of the inner body 20 in a state where the height of the lifting frame 343 is adjusted to the uppermost position (see FIG. 3).

The operation of the blade protection cover 33 and the like by a structure of the height adjusting unit 34 will be described.

The height adjusting unit 34 may be operated by the user's manual operation.

When the user holds the handle portion 341c of the height adjusting lever 341 to rotate it in one direction, the lever body 341a rotates in a circumferential direction at an upper end of the receiving portion 23. The rotating protrusion portion 341a at a lower end of the lever body 341a and the coupling protrusion 342a at an upper end of the rotating cylindrical portion 342 are engaged and coupled to each other so that the lever body 341a and the rotating cylindrical portion 342 rotate together. The height adjusting lever 341 and the rotating cylindrical portion 342 are restricted from being lowered by the lowering restriction protrusion 342b of the rotating cylindrical portion 342 and rotated in place.

Though the rotation of the lifting frame 343 is restricted by the rotation restricting protrusion 343a formed on an outer circumferential surface thereof, the spiral protrusion 343c formed on an inner circumferential surface of the lifting frame 343 is tooth-coupled with the rotation guide protrusion 342c formed on an outer circumferential surface of the rotating cylindrical portion 342, and the lifting frame 343 is lowered as the spiral protrusion 343c moves downward along the rotation guide protrusion 342c.

When the handle portion 341c of the height adjusting lever 341 is rotated in an opposite direction, the lifting frame 343 is raised by the same principle as the lowering mechanism.

The blade protection cover 33, the rotating plate 32, the blade 31 and the like coupled to a lower portion of the lifting frame 343 may be adjusted in height by lifting and lowering together with the lifting frame 343.

Figure 11:
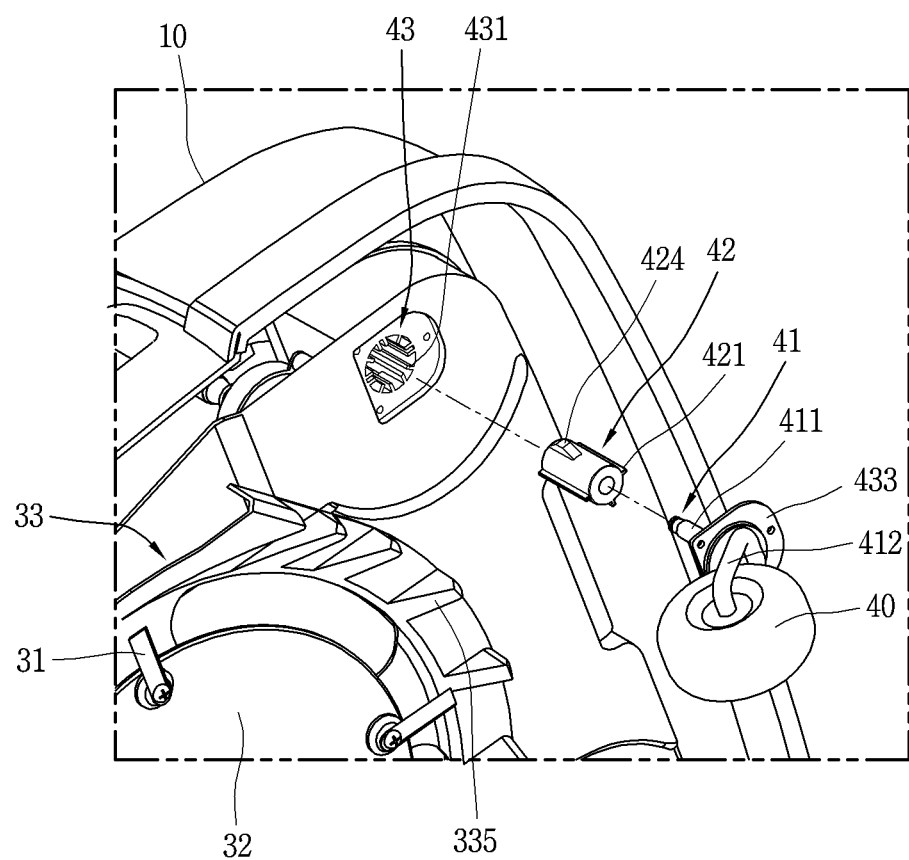
FIG. 11 is an exploded view illustrating a lowering detection device of a caster according to the present disclosure.
Figure 12:
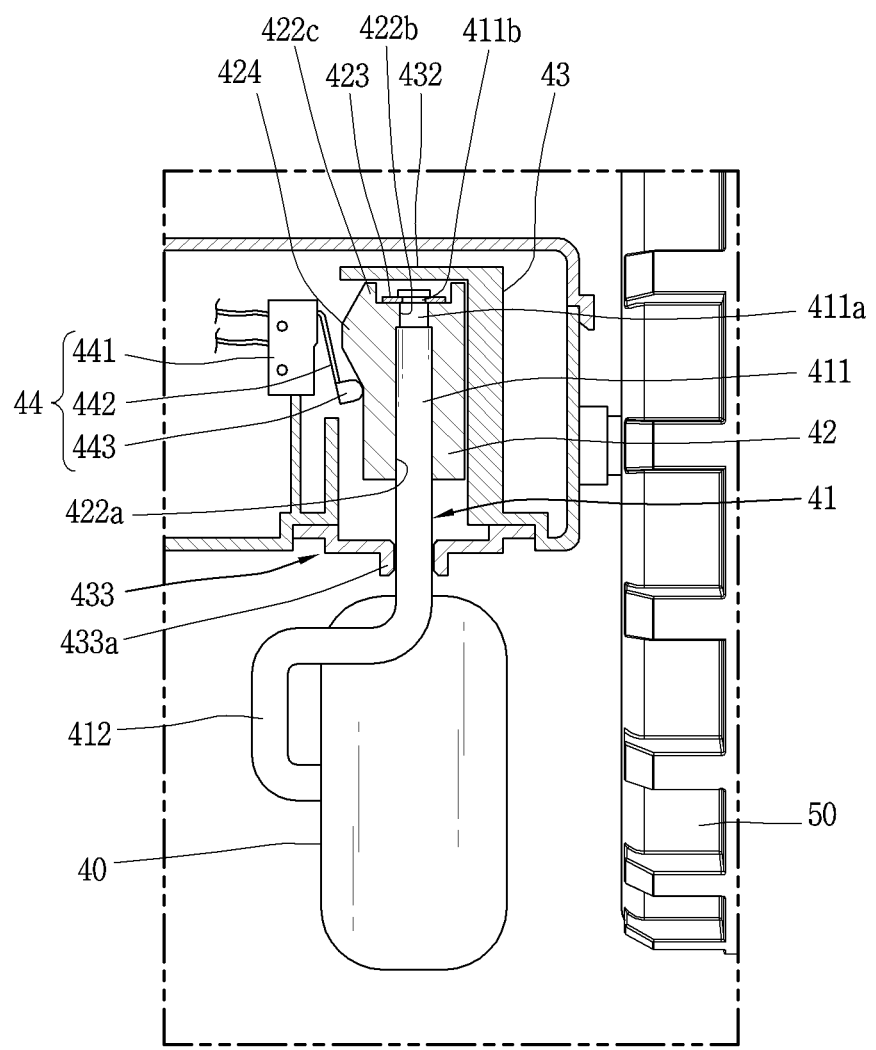
FIG. 12 is a conceptual view illustrating a state in which the rotation shaft is raised by the caster of FIG. 11 contacting the ground.
Figure 13:
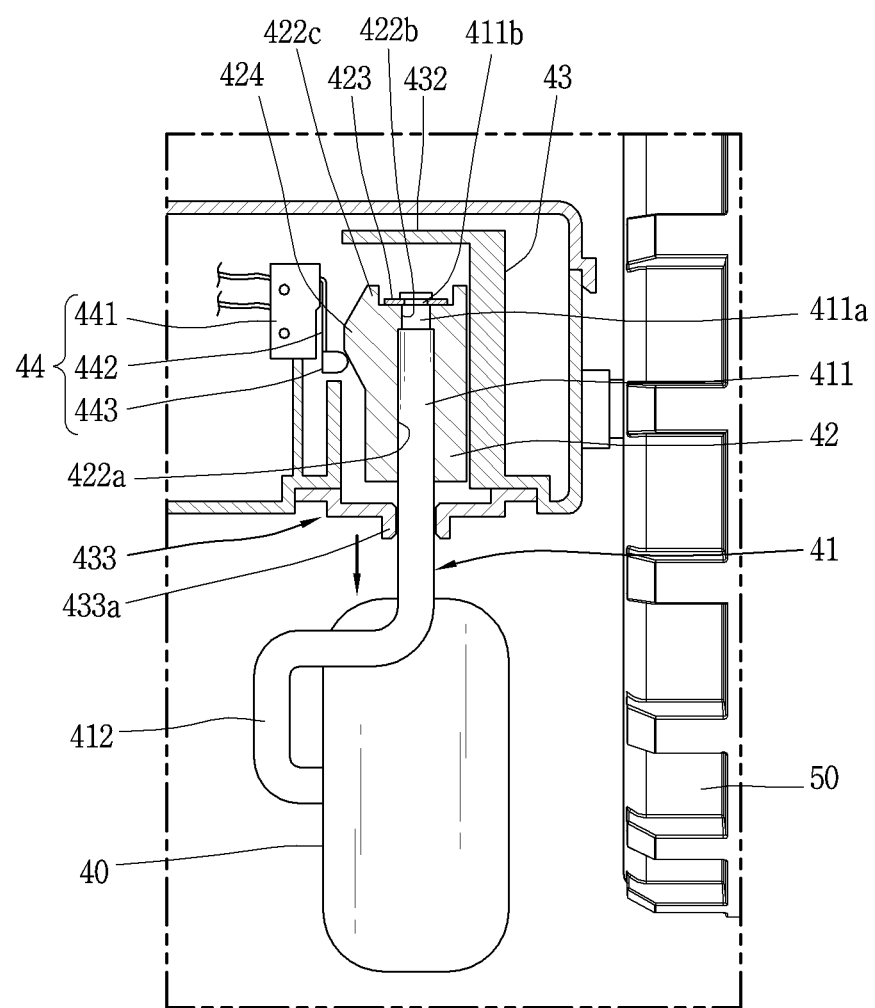
FIG. 13 is a conceptual view illustrating a state in which the rotation shaft is lowered in a state where the caster of FIG. 11 is caught on a cliff or the like, and floating in the air.

FIG. 11 is an exploded view illustrating a lowering detection device of a caster 40 according to the present disclosure, and FIG. 12 is a conceptual view illustrating a state in which the rotation shaft 41 is raised by the caster 40 of FIG. 11 contacting the ground, and FIG. 13 is a conceptual view illustrating in which the rotation shaft 41 is lowered in a state where the caster 40 of FIG. 11 is caught on a cliff or the like, and floating in the air.

The lawn mower robot may be caught in a puddle or a cliff during driving and may cause the caster 40, which is a front wheel, not to touch the ground while floating in the air. In this case, in order to prevent the occurrence of a safety accident, a sensor unit for sensing whether the caster 40 does not touch the ground while floating in the air is provided on a bottom surface of the inner body 20. A control unit 80 receives a sensing signal from the sensor unit and stops the operation of the lawn mower robot while the caster 40 is floating in the air.

The caster 40 is formed into a cylindrical shape. The caster 40 is pivotably provided at a front bottom surface of the inner body 20 through rotation shaft 41. One side of the rotation shaft 41 is coupled to a bottom surface of the inner body 20, and the other side of the rotation shaft 41 is coupled to a lateral center portion of the caster 40.

The rotation shaft 41 is formed into a circular bar shape. A vertical portion 411 formed linearly at one side of the rotation shaft 41 is disposed perpendicular to the ground, and rotatably coupled to a bottom surface of the inner body 20 through the shaft supporter 42. A supporter receiving portion 43 for receiving the shaft supporter 42 is formed on a bottom surface of the inner body 20.

A plurality of lifting guide protrusions 431 are formed on the supporter receiving portion 43 to be spaced apart in a circumferential direction, and a plurality of lifting guide protrusions 431 guide the shaft supporter 42 so that the shaft supporter 42 can move upward and downward.

The shaft supporter 42 surrounds the vertical portion 411 of the rotation shaft 41, and supports the rotation shaft 41 so that the rotation shaft 41 is rotatable.

The shaft supporter 42 may be formed in a cylindrical shape, and a plurality of rotation preventing protrusions 421 may be formed on an outer circumferential surface of the shaft supporter 42 to be circumferentially spaced apart from each other, and the plurality of rotation preventing protrusions 421 may be inserted between the lifting guide protrusion 431 of the supporter receiving portion 43 to move the shaft supporter 42 upward and downward.

The shaft supporter 42 has an insertion hole 422a and a coupling hole 422b therein. The insertion hole 422a is formed on a bottom surface of the shaft supporter 42 to be perpendicular to an inside thereof to insert the vertical portion 411 of the rotation shaft 41 through the insertion hole 422a. The coupling hole 422b is formed so that a diameter of the coupling hole 422b becomes narrower from an upper end of the insertion hole 422a in a straight upward direction. A coupling groove portion 411a is formed at an upper end of the vertical portion 411 of the rotation shaft 41 to have a small diameter. When the vertical portion 411 of the rotation shaft 41 is inserted through the insertion hole 422a at a lower portion of the shaft supporter 42, only the coupling groove portion 411a on the vertical portion 411 of the rotation shaft 41 is inserted into the coupling hole 422b, and part of the remaining vertical portion 411 excluding the coupling groove portion 411a is received and coupled to the insertion hole 422a.

Furthermore, at an upper end of the shaft supporter 42, a support groove 422c is formed to be larger in diameter than the insertion hole 422a and concave in a downward direction.

A release preventing member 423 is mounted on an upper end portion of the vertical portion 411 of the rotation shaft 41. A coupling groove 411b is formed to have a small diameter at an upper end of the coupling groove portion 411a of the rotation shaft 41, and a hole is formed at a center portion of the release preventing member 423 to allow the coupling groove 411b of the rotation axis 41 to pass therethrough, and the release preventing member 423 is inserted into the coupling groove 411b so that an upper end of the rotation shaft 41 is caught by the release preventing member 423, thereby preventing the rotation shaft 41 from being released in a downward direction by gravity from the shaft supporter 42.

A height restricting portion 432 is formed at an upper end portion of the supporter receiving portion 43. The height restricting portion 432 is disposed at an upper portion of the shaft supporter 42 to block the shaft supporter 42 and the vertical portion 411 of the rotation shaft 41 from being raised. As a result, the maximum rising height is restricted when the shaft supporter 42 and the vertical portion 411 of the rotation shaft 41 are raised within the supporter receiving portion 43.

A bracket 433 is mounted on at lower end portion of the supporter receiving portion 43. A bracket coupling groove may be formed in a shape corresponding to the bracket 433 at a lower end of the supporter receiving portion 43. The bracket 433 is received and coupled to the bracket coupling groove, and an edge portion of the bracket 433 is fastened to the supporter receiving portion 43 by a plurality of screws. A shaft support hole through which the vertical portion 411 of the rotation shaft 41 passes is formed, and a shaft support portion 433a that is bent downward from the shaft support hole of the bracket 433 is provided at a center portion of the bracket 433 to surround the vertical portion 411 of the rotation shaft 41 and rotatably support the vertical portion 411 of the rotating shaft 41. The bracket 433 is configured to limit a minimum height of the shaft supporter 42 when the shaft supporter 42 is lowered.

A caster coupling portion 412 is formed in a "⊏" shape on the other side of the rotation shaft 41. An end portion of the caster coupling portion 412 is coupled to a center portion of the caster 40 through a bearing so that the caster 40 is rotatably supported by the rotation shaft 41. The end portion of the caster coupling portion 412 of the rotation shaft 41 is formed eccentrically to one side from the vertical portion 411 of the rotation shaft 41 so that the caster 40 can pivot about the vertical portion 411 of the rotation shaft 41 along a trajectory having a predetermined curvature.

The lowering protrusion 424 may protrude from an upper end portion of an outer circumferential surface of the shaft supporter 42. The lowering protrusion 424 moves upward and downward together with the shaft supporter 42.

A drop switch 44 is provided at one side of the supporter receiving portion 43 to detect whether the shaft supporter 42 is lowered. The drop switch 44 has a rectangular shaped switch body 441, a switch operation lever 442 coupled in an inclined manner to one side of the switch body 441 with a hinge structure, and a contact portion 443 protruding from the switch operation lever. At this time, the switch operation lever 442 is elastically supported by the switch body 441.

The drop switch 44 is vertically disposed at one side of the supporter receiving portion 43, and the switch operation lever 442 is disposed to face the lowering protrusion 424, and the contact portion 443 is disposed in contact with a lower portion of the lowering protrusion 424. The drop switch 44 generates an electrical signal for turning off an internal contact of the switch operation lever 442 when a pushing force is received from the lowering protrusion 424, and turning off the internal contact when the pushing force is released.

The inner body 20 is lowered by its own weight when the caster 40 is in contact with the ground, and the shaft supporter 42 is brought into contact with the height restricting portion 432 formed at an upper portion of the supporter receiving portion 43, and the vertical portion 41 of the rotation shaft supports a load of the inner body 20 through the shaft supporter 42. The vertical portion 411 of the rotation shaft 41 rises together with the shaft supporter 42 with respect to a receiving portion of the inner body 20.

If a front portion of the inner body 20 falls into a cliff or the like and the caster 40 is floating in the air, then the caster 40 and the rotation shaft 41 are lowered by gravity. The shaft supporter 42 coupled to the vertical portion 411 of the rotation shaft 41 is lowered while the lowering protrusion 424 is also lowered.

The lowering protrusion 424 is brought into contact with the contact portion 443 to pressurize the contact portion 443 toward the switch body 441 when moving downward, and push the switch operation lever 442 toward the switch body 441, and thus the internal contact of the switch body 441 generates an ON signal. As a result, the control unit 80 receives a sensing signal from the drop switch 44 to sense whether the caster 40 falls into a cliff or the like and is in a floating state, and stop the driving of the wheel 50 and the operation of the blade 31.

Figure 14:
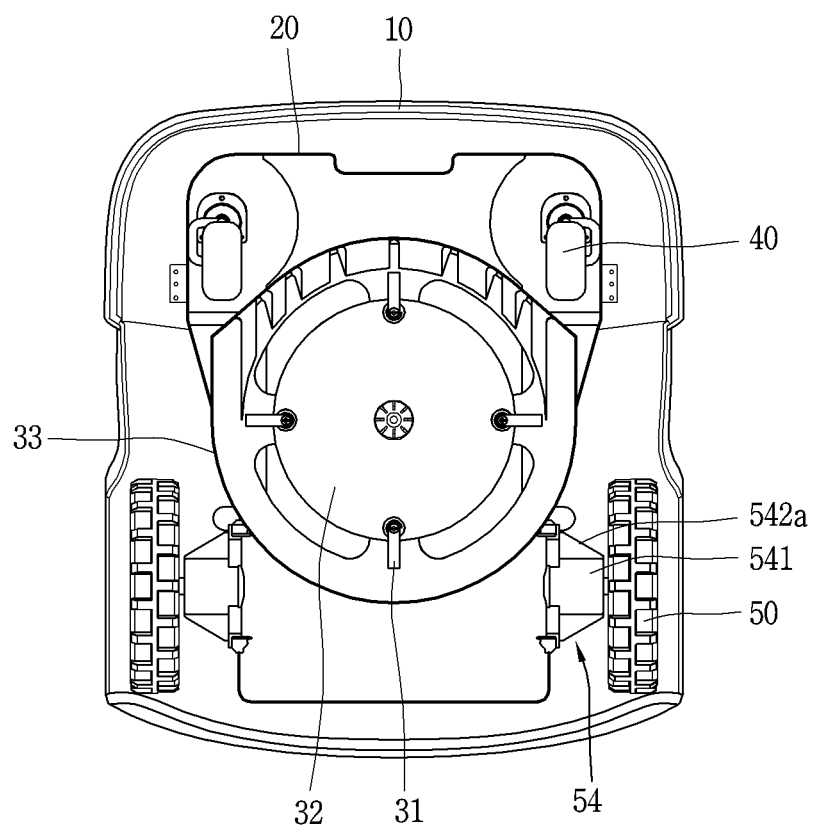
FIG. 14 is a conceptual view illustrating a state in which a wheel driving unit as viewed from the bottom of FIG. 1 is mounted between a wheel and an inner body.
Figure 15:
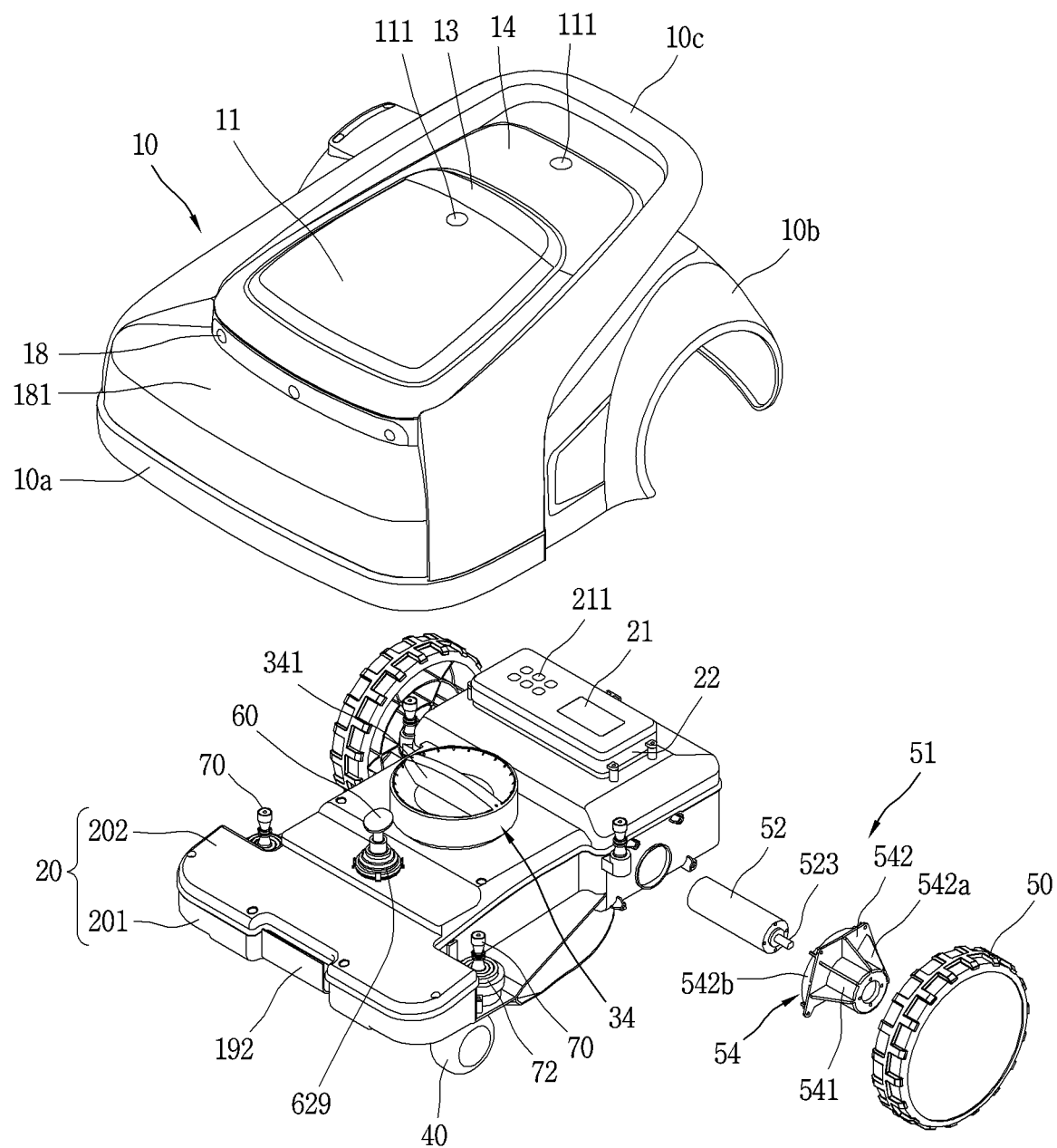
FIG. 15 is an exploded view illustrating the wheel driving unit of FIG. 14.
Figure 16:
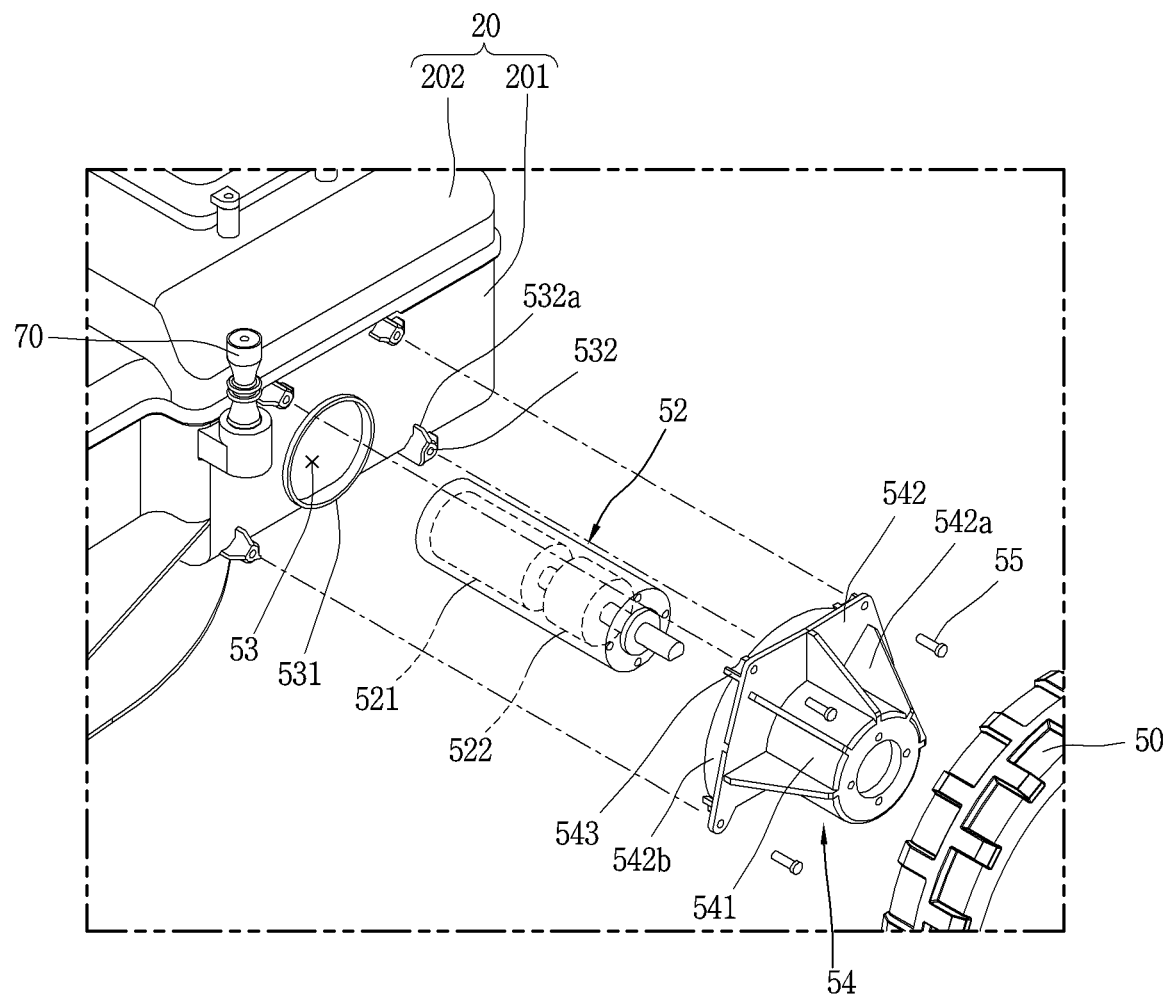
FIG. 16 is an enlarged exploded view illustrating a structure in which the wheel driving unit is fastened in FIG. 15.

FIG. 14 is a conceptual view illustrating a state in which a wheel driving unit 51 as viewed from the bottom of FIG. 1 is mounted between the wheel 50 and the inner body 20, and FIG. 15 is an exploded view illustrating the wheel driving unit 51 of FIG. 14, and FIG. 16 is an enlarged exploded view illustrating a structure in which the wheel driving unit 51 is fastened in FIG. 15.

The wheel driving unit 51 is mounted on both sides of the inner body 20, respectively, to drive the wheel 50.

A wheel driving unit receiving hole 53 is formed at the rear side on both side surfaces of the inner body 20.

The wheel driving unit 51 includes a drive motor and a power transmission gear 522. The drive motor includes a stator and a rotor, and a device configured to receive power from a battery to generate a rotational force by an electromagnetic interaction between the stator and the rotor.

The power transmission gear 522 is mechanically connected to the drive motor and configured to receive power from the drive motor and reduce a rotational speed of the motor so as to transmit an increased torque to the wheel 50. The power transmission gear 522 may include a planetary gear set such as a sun gear, a planetary gear, a ring gear, and a carrier.

The drive motor and the power transmission gear 522 may be received in a single housing 52 and modularized into one module. A plastic gear or a metal gear may be selectively applied to the power transmission gear 522. In order to accommodate both the drive motor and the power transmission gear 522, a housing 52 may be formed in a cylindrical shape having a relatively long length compared to the diameter.

The rotation shaft 523 may be formed to protrude in an axial direction from one side of the housing 52. One side of the rotation shaft 523 is connected to the power transmission gear 522, and the other side of the rotation shaft 523 is connected to the wheel 50 to transmit a rotational force transmitted from the power transmission gear 522 to the wheel 50. The power transmission gear 522 receives a rotational force of the drive motor, reduces a rotational speed by the gear ratio, increases the torque, and transmits the increased torque to the wheel 50 through the rotation shaft 523.

Part of the housing 52 may be received in the inner body 20 through the wheel driving unit receiving hole 53. One side of the inner body 20 may be formed by bending a bending portion 531 protruding outward from the wheel driving unit receiving hole 53 along a circumferential direction, thereby supporting part of the housing 52 received through the wheel driving unit receiving hole 53.

A housing supporter 54 is provided to mount the housing 52 on both sides of the inner body 20 while part of the housing 52 is received in the inner body 20.

The housing supporter 54 includes a housing coupling portion 541 and a flange portion 542.

The housing coupling portion 541 is formed in a cylindrical shape to surround an outer circumferential surface of the housing 52. A housing space capable of receiving part of the housing 52 is formed within the housing coupling portion 541. In addition, one side of the housing coupling portion 541 may be open to insert part of the housing 52 into the housing coupling portion 541 through the opening portion. A hole is formed at a center portion of the other side of the housing coupling part 541 to allow the rotation shaft 523 to pass therethrough. One end portion of the housing 52 is fastened to the other side of the housing coupling portion 541 with a bolt while being housed inside the housing engaging portion 541.

The flange portion 542 is formed in a rectangular plate shape, and disposed vertically at one end portion of the housing coupling portion 541. Fastening holes for fastening a bolt 55 are formed at the corner portions of the flange portion 542, respectively.

A plurality of ribs 542a may be provided at one side of the flange portion 542 to increase coupling strength between the flange portion 542 and the housing coupling portion 541. The plurality of ribs 542a may be spaced apart from each other in a circumferential direction of the housing coupling portion 541. The plurality of ribs 542a may be formed in a right triangular plate shape. One side (a bottom side a rectangle) of each rib 542a is coupled to one side surface of the flange portion 542, and the other side (a height side of a rectangle) of each rib 542a is coupled to an outer circumferential surface of the housing coupling portion 541.

A spacer 542b may be formed on the other side surface of the flange portion 542 along a circumferential direction. The spacer 542b may reinforce the strength of the flange portion 542 while maintaining an interval between the flange portions 542 to be constant from a side surface of the inner body 20.

A fastening portion 532 for fastening a corner portion of the flange portion 542 is formed to protrude from a side surface of the inner body 20. The fastening portion 532 may be formed in a cylindrical tube shape, and a plurality of reinforcing ribs 532a may be formed on an outer circumferential surface of the fastening portion 532. The plurality of reinforcing ribs 532a may be spaced apart from each other by three at an interval of 90 degrees along a circumferential direction at an upper portion of each fastening portion 532. A fastening hole for fastening a bolt 55 is formed within the fastening portion 532.

Each of a plurality of bolts 55 may be fastened to the fastening portion 532 formed on the side surface of the inner body 20 through the fastening hole formed at an edge of the flange portion 542, thereby obtaining a secure fastening between the flange portion 542 and the inner body 20.

A plurality of guide portions 543 may protrude from the other side surface of the flange portion 542 toward a side surface of the inner body 20. The plurality of guide portions 543 may be formed in a semicircular curved shape to surround a lower outer circumferential surface of the fastening portion 532. As a result, it may be possible to increase the fastening strength of the fastening portion 532.

According to the configuration of the wheel driving unit 51, the drive motor and the power transmission gear 522 are received in one housing 52 and modularized into one module, and the wheel driving unit 51 in which the drive motor and the power transmission gear 522 are modularized is fastened to the inner body 20 through the housing supporter 54, thereby having an advantage that it is convenient to replace different types of gears even when a plastic gear or metal gear is selectively applied thereto.

Figure 17:
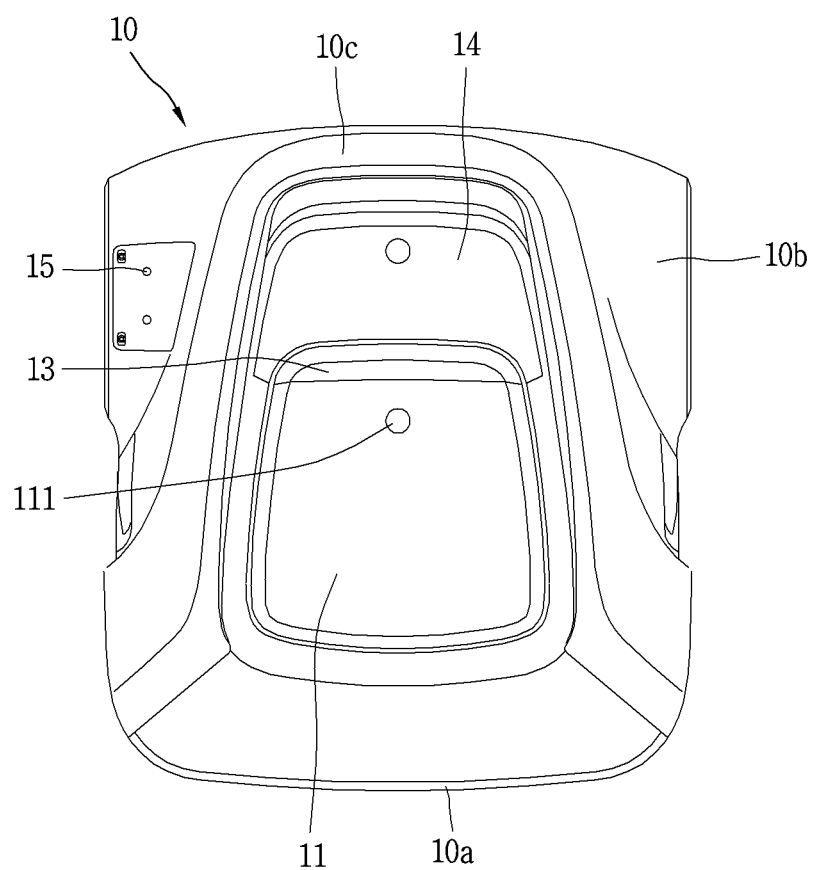
FIG. 17 is a plan view illustrating an appearance of a lawn mower robot according to the present disclosure.
Figure 18:
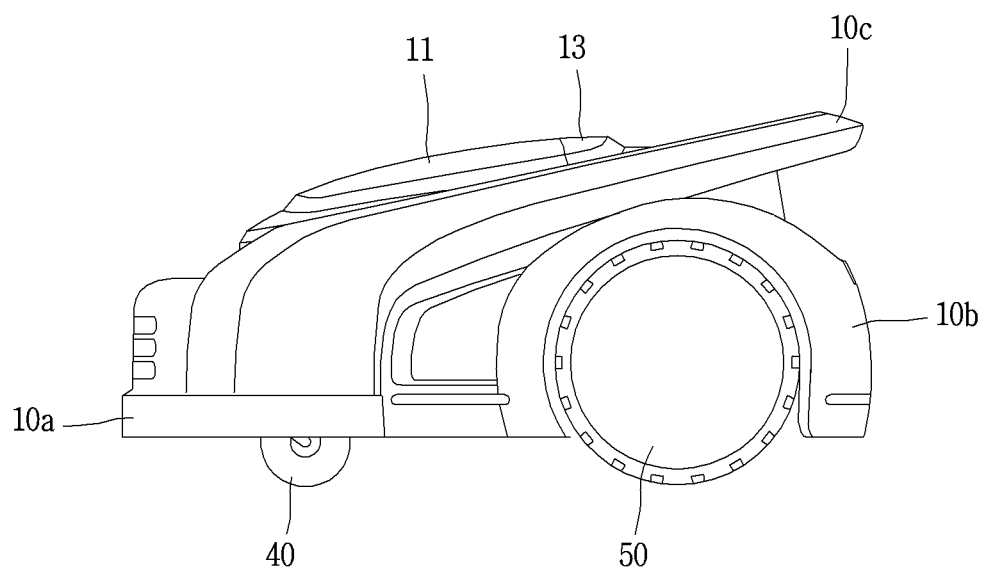
FIG. 18 is a side view of FIG. 17.
Figure 19:
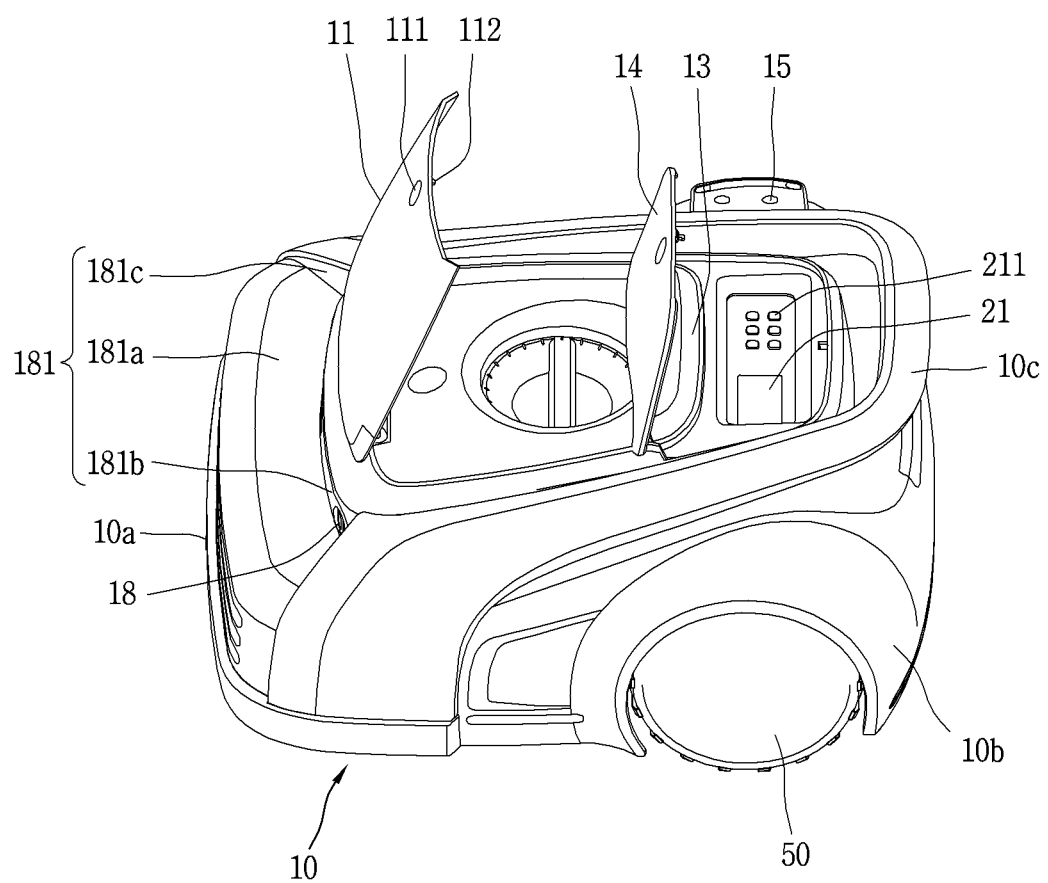
FIG. 19 is a perspective view illustrating a state in which first and second covers are open in FIG. 17.
Figure 24:
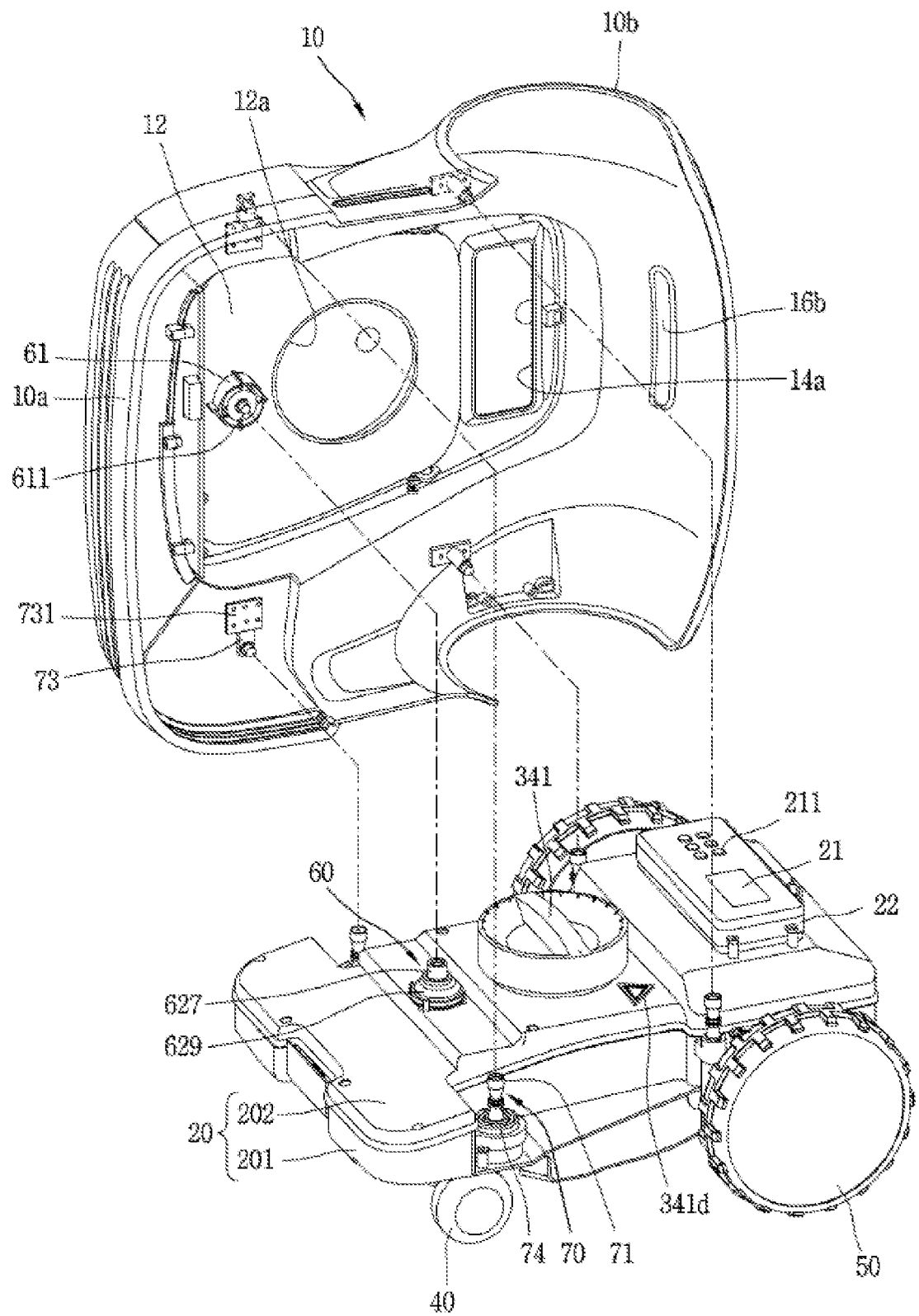
FIG. 24 is an exploded view illustrating a coupling relation among a joystick bumper, a support portion, and an outer cover according to the present disclosure.

FIG. 17 is a plan view illustrating an appearance of a lawn mower robot according to the present disclosure, and FIG. 18 is a side view of FIG. 17, and FIG. 19 is a perspective view illustrating a state in which a first and a second cover 14 are open in FIG. 17. Moreover, FIG. 24 is a perspective view including a bottom of the outer cover.

The outer cover 10 of the lawn mower robot according to the present disclosure is formed in a rounded or inclined manner so that there is no recessed shape not to allow water (rain) or dust to be piled up or accumulated on an upper portion thereof. The first cover 11 is rotatably mounted on an upper portion of the outer cover 10, and a front end portion of the first cover 11 is hinge-coupled so that a rear end portion of the first cover 11 is rotatable up and down. A cover coupling portion 12 to which the first cover 11 is coupled is provided on the outer cover 10, and the cover coupling portion 12 is formed concave downward along an edge portion of the first cover 11, and thus the cover coupling portion 12 may be configured to partition outer and the inner side space of the outer cover 10 from an upper portion of the outer cover 10. The cover coupling portion 12 is formed in a shape corresponding to the first cover 11, and disposed to cover part of an upper portion of the inner body 20.

A first opening portion 12a communicating with the height adjusting lever 341 is provided on the cover coupling portion 12 to operate the height adjusting lever 341. The first cover 11 is configured to open and close an upper portion of the cover coupling portion 12 and the first opening 12a. When the first cover 11 is open, the user may rotate the height adjusting lever 341 to adjust the height of the blade 31 or the like. The indicator 341d is formed adjacent to an upper end of the receiving portion of the inner body 20 in the vicinity of the height adjusting lever 341, and part of a scale shown on the height adjusting lever 341 corresponds to a triangle vertex of the indicator 341d, and thus a numerical value of the corresponding scale becomes the height of the blade 31.

A circular pressing portion 111 is formed concave on an upper surface of a rear end portion of the first cover 11 at an upper portion of the outer cover 10 to allow the user to press the pressing portion 111. A locking protrusion 112 is formed on a lower surface of the pressing portion 111, and a locking groove is formed on the cover coupling portion 12 at a position corresponding to the locking protrusion 112, and thus when the pressing portion 111 is pressed once, the locking protrusion 112 may be released to open the first cover 11. When the first cover 11 is closed, it may be locked by coupling of the locking protrusion 112 to the locking groove. A spring 623 is provided between the first cover 11 and the cover coupling portion 12 so that the first cover 11 can be open by an elastic force of the spring 623. A damper may be provided between the first cover 11 and the cover coupling portion 12 to smoothly open the first cover 11 at a constant speed by the damper.

An emergency stop switch 13 may be installed at a rear side of the first cover 11 to allow a pressing operation in an upward and downward direction. When the emergency stop switch 13 is pressed by the user in an emergency, an ON signal is generated to stop the operation of the wheel 50 and the blade 31.

A display 21 and a keypad 211 are provided at a rear upper portion of the inner body 20. The display 21 may be implemented as an LCD, the keypad 211 may be provided with digits 0 to 9, BACK and ENTER, and the like. A main PCB 22 may be mounted under the display 21 and the keypad 211.

A second opening portion 14a is formed at a rear side of the outer cover 10. The second opening portion 14a is configured to communicate with the display 21 and the keypad 211. The first cover 14 is rotatably mounted at a rear side of the outer cover 13, and both front side end portions of the first cover 14 is hinge-coupled to rotate a rear end portion of the second cover 14. The second cover 14 is configured to open and close the second opening portion 14a. The second cover 14 is also formed with a pressing portion 111 similar to the first cover 11, and provided with a locking protrusion 112, a spring 623, a damper and the like for opening and closing the second cover 14.

A plurality of charging terminals 15 are provided at an upper side of a right fender portion 10b of the outer cover 10.

Figure 20:
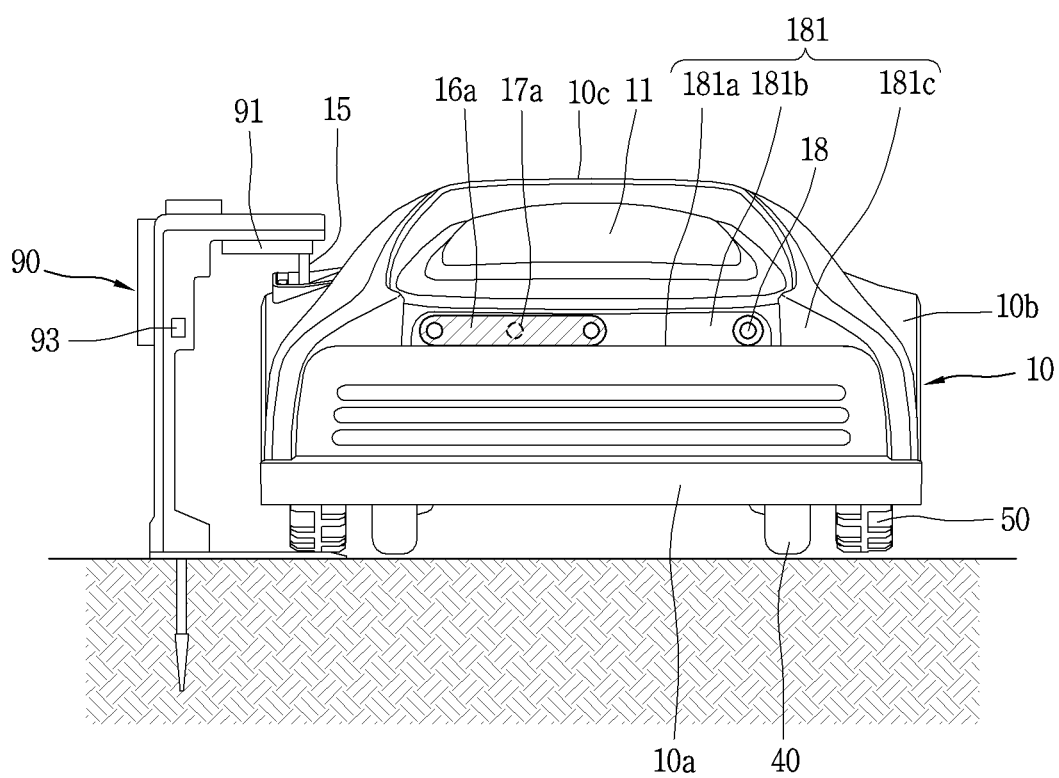
FIG. 20 is a conceptual view illustrating an IR receiving window installed at a front side of an outer cover in FIG. 17.
Figure 21:
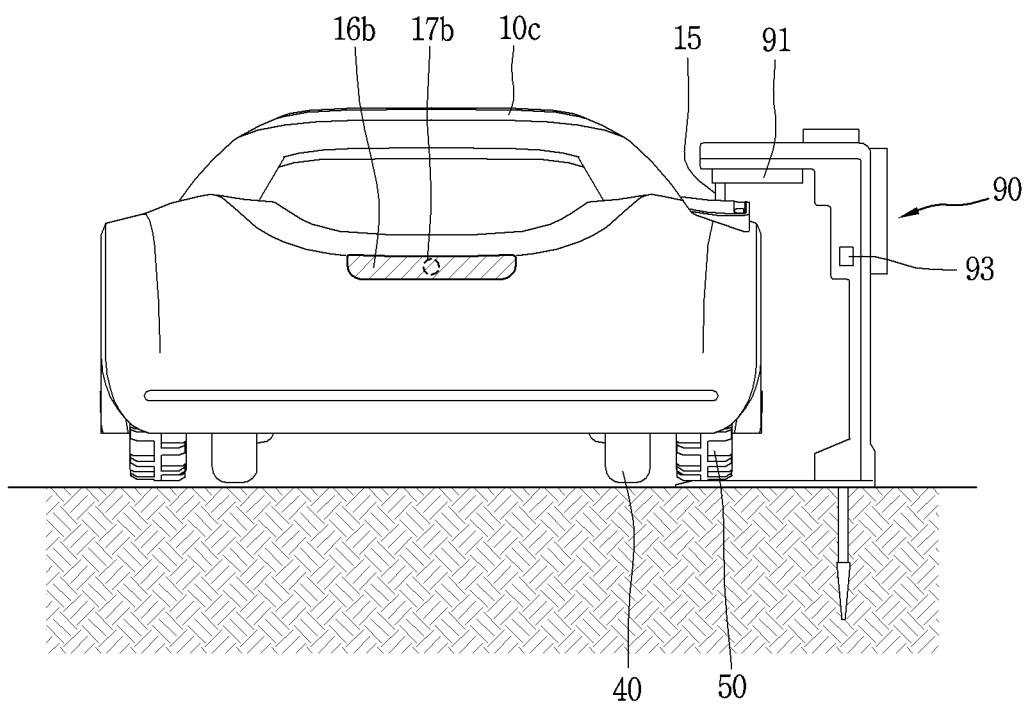
FIG. 21 is a conceptual view illustrating an IR receiving window installed at a rear side of the outer cover in FIG. 17.
Figure 22A:
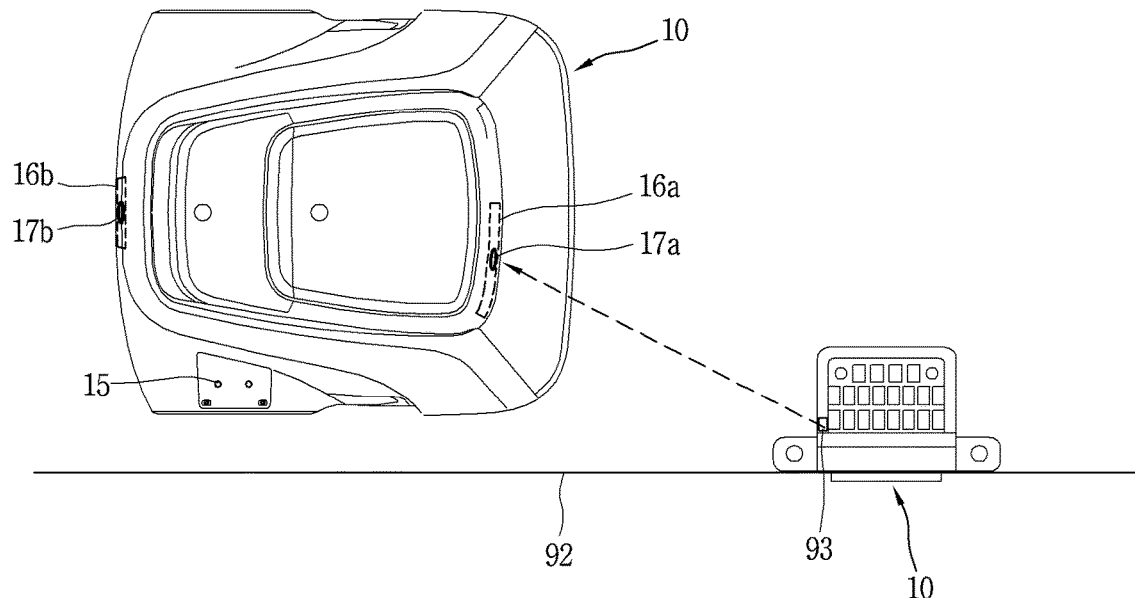
FIG. 22A is a conceptual view illustrating a state in which infrared rays emitted from an IR transmitting window of a charging stand are received by the IR receiving window of FIG. 20.
Figure 22B:
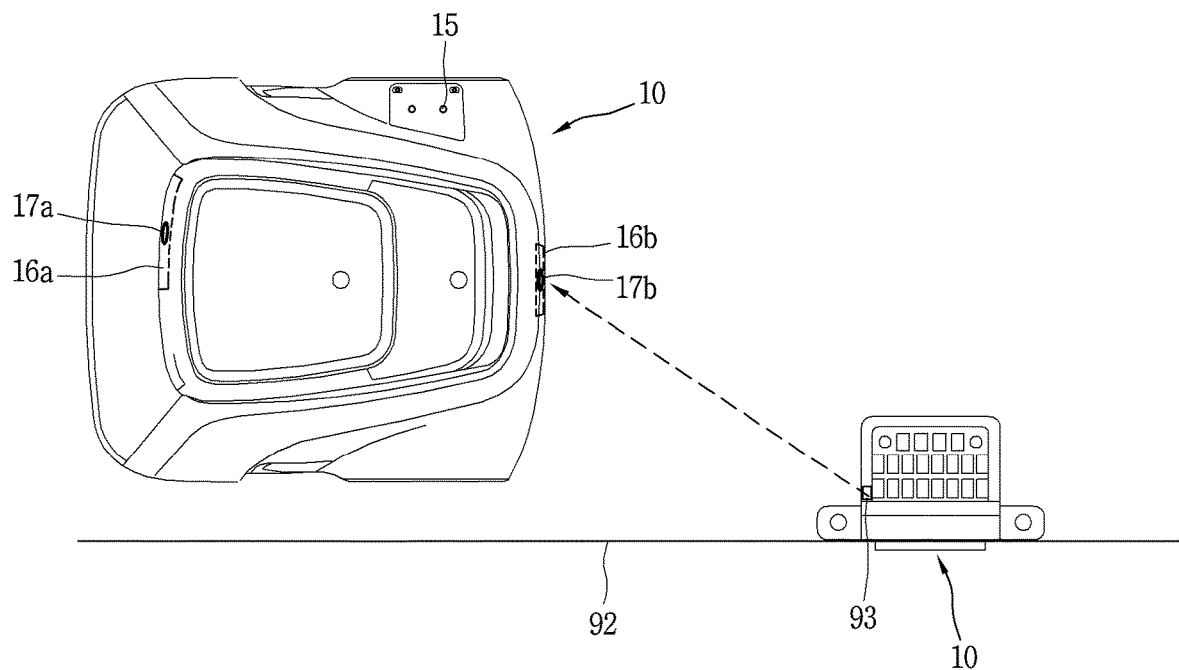
FIG. 22B is a conceptual view illustrating a state in which infrared rays emitted from an IR transmitting window of a charging stand are received by the IR receiving window of FIG. 21.

FIG. 20 is a conceptual view illustrating an IR receiving window 16a installed at a front side of the outer cover 10 in FIG. 17, and FIG. 21 is a conceptual view illustrating an IR receiving window 16b installed at a rear side of the outer cover 10 in FIG. 17, and FIG. 22A is a conceptual view illustrating a state in which infrared rays emitted from an IR transmitting window 93 of a charging stand 90 are received by the IR receiving window 16a of FIG. 20, and FIG. 22B is a conceptual view illustrating a state in which infrared rays emitted from the IR transmitting window 93 of the charging stand 90 are received by the IR receiving window 16b of FIG. 21.

Charging terminals 91 are provided at an upper portion of the charging stand 90 to charge a battery of the lawn mower robot through the charging terminals 91 when the lawn mower robot enters the charging stand 90.

The charging terminals 15 of the outer cover 10 may be formed to protrude beyond the outer cover 10 by a predetermined height or more to avoid interference with the charging stand 90. The charging terminals 91 of the charging stand 90 are elastically supported by a spring 623 so as to be vertically movable so that the outer cover 10 can be easily brought into contact with the charging terminals 15 while avoiding interference with the outer cover 10.

A distance between an end of the right wheel 50 of the outer cover 10 and a right end of the charging stand 90 may be spaced within a predetermined range when the lawn mower robot enters the charging stand 90. The spring 623 type charging terminals 91 of the charging stand 90 are formed in an elongated manner in a front-rear direction while maintaining a constant width at an upper portion of the charging stand 90 so that the charging terminals 15 of the outer cover 10 are brought into contact with the charging terminals 91 of the charging stand 90 even when a distance between the outer cover 10 and the charging stand 90 is changed.

A docking wire 92 is connected to front and rear ends of the charging stand 90, and the docking wire 92 is a device for guiding the lawn mower robot to enter the charging stand 90 with a predetermined distance. The lawn mower robot may be provided with a coil sensor at a front side of the inner body 20 to sense the docking wire 92. The coil sensor senses the position of the docking wire 92 to allow the lawnmower robot to enter the charging stand 90 with a predetermined distance.

Infrared rays may be irradiated from the charging stand 90 toward the lawn mower robot to make an efficient contact between the charging terminals 15 of the lawn mower robot and the charging terminals 91 of the charging stand 90.

An IR transmitting window 93 and an IR transmitting sensor for irradiating infrared rays may be installed at one side of the charging stand 90 to detect the position of the lawn mower robot. The IR transmitting window 93 of the charging stand 90 is made of a light transmitting material, and infrared rays be irradiated to the lawn mower robot through the IR transmitting window 93 when the IR transmitting sensor generates infrared rays. The irradiation direction (irradiation angle) of the IR transmitting sensor may be irradiated to the robot with respect to the docking wire 92 at a predetermined inclination angle, for example, 30 degrees (see FIGS. 22A and 22B).

The IR receiving window 16a is formed on a front surface of the outer cover 10 to transmit infrared rays irradiated from the IR transmitting window 93. The IR receiving window 16a is formed in an elongated manner in the right direction from a longitudinal center line of the outer cover 10, and located close to the charging stand 90. The IR receiving sensor 17a may be disposed at a rear side of the IR receiving window 16a to sense infrared rays transmitted through the IR receiving window 16a so as to sense the position of the charging stand 90. The IR receiving sensor 17a may sense the position of the charging stand 90 through infrared rays so that the charging terminal 15 of the outer cover 10 can be brought into contact with the charging terminals 91 of the charging stand 90.

The IR receiving window 16b is formed at a rear center portion of the outer cover 10 to transmit infrared rays irradiated from the IR transmitting window 93. The IR receiving sensor 17b is disposed at a front side of the IR receiving window 16b to sense infrared rays transmitted through the IR receiving window 16b so as to sense that the lawn mower robot has passed the charging stand 90.

Figure 23:
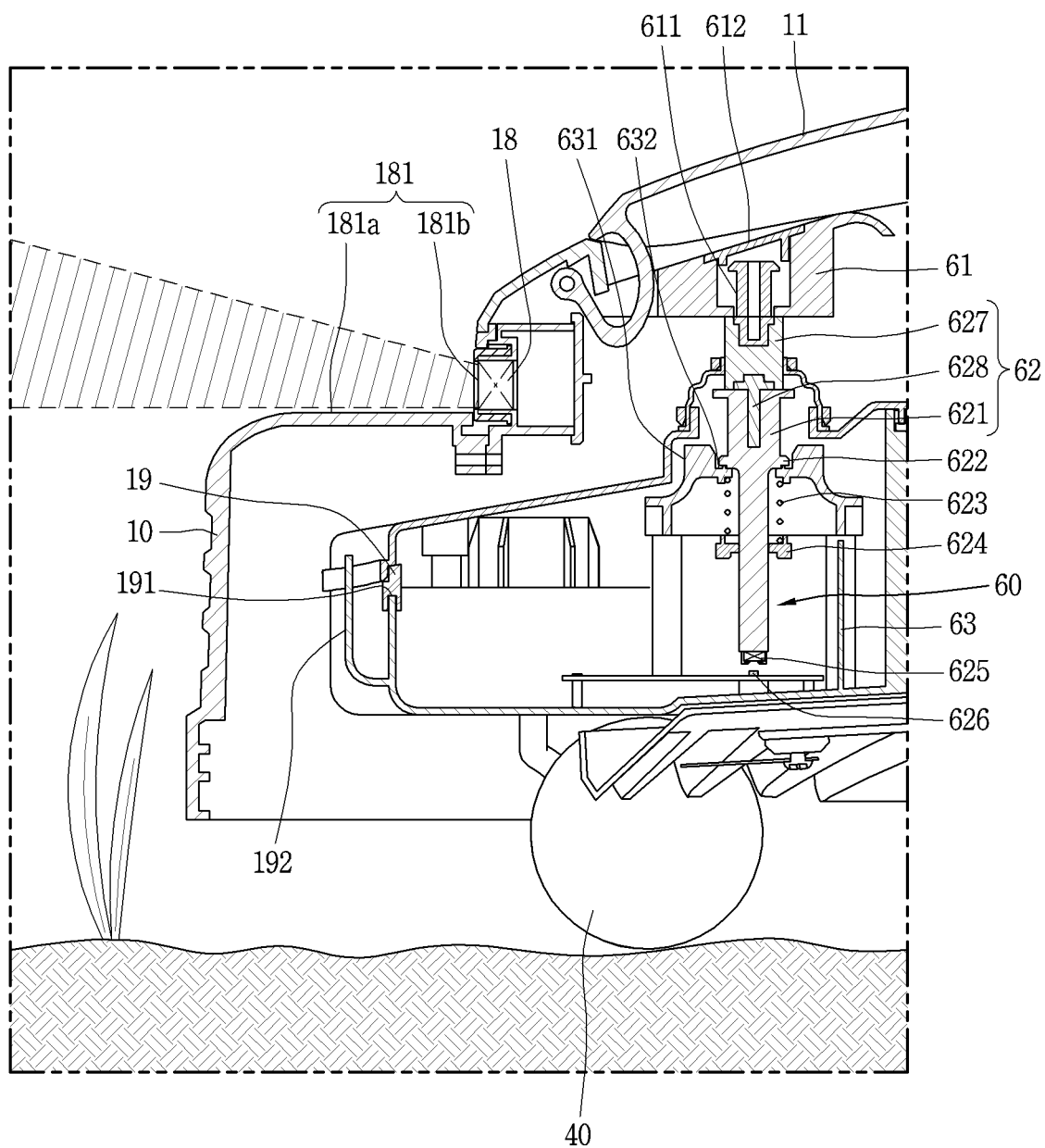
FIG. 23 is a conceptual view illustrating an ultrasonic sensor installed at a front side of the outer cover.

FIG. 23 is a conceptual view illustrating an ultrasonic sensor 18 installed at a front side of the outer cover 10.

The lawn mower robot has a plurality of ultrasonic sensors 18 capable of sensing an obstacle in the front in order to avoid collision with the obstacle. The plurality of ultrasonic sensors 18 are installed on a front surface of the outer cover 10 to transmit ultrasonic waves toward the front of the outer cover 10 and receive ultrasonic waves reflected from an obstacle to sense the obstacle. The control unit 80 receives a sensing signal from the ultrasonic sensor 18 to sense an obstacle in the front, and controls the drive motor 521 of the wheel 50 to reduce the driving speed of the lawn mower to avoid collision with the obstacle.

However, ultrasonic waves may be reflected by grass as well as the obstacle located in front of the outer cover 10 when driving the lawnmower robot, and thus the ultrasonic sensor 18 may recognize the grass to be cut as an obstacle. As a result, it causes a problem that the grass cutting robot stops in front of the grass to be cut according to the sensing signal of the ultrasonic sensor 18 not to cut the grass.

Therefore, in order to solve this problem, it is necessary to limit a downward irradiation angle of ultrasonic waves not to irradiate ultrasonic waves to the grass at a predetermined height or less from the ground.

To this end, an ultrasonic guide unit 181 is provided in front of the outer cover 10. The ultrasonic guide part 181 is formed to be recessed backward while maintaining a constant height from a front end portion of the outer cover 10.

The ultrasonic guide unit 181 includes a horizontal surface 181a horizontally formed at a preset height from an upper end of a front end portion of the outer cover 10. The horizontal plane 181a may be located at a height corresponding to the installation position of the ultrasonic sensor 18. As a result, ultrasonic waves propagate over the horizontal plane 181a without propagating below the horizontal surface 181a to limit a downward propagation angle of the ultrasonic waves.

There should be no structure above the horizontal surface 181a. It is because when there is a structure above the horizontal surface 181a, ultrasonic waves may be reflected by the structure and propagate below the horizontal plane 181a.

The ultrasonic guide unit 181 has a mounting surface 181b. The mounting surface 181b may be formed to intersect in an upward direction from a rear end of the horizontal surface 181a. A plurality of ultrasonic sensors 18 may be embedded in the mounting surface 181b. The ultrasonic waves may propagate forward and upward by the mounting surface 181b and the horizontal surface 181a. The plurality of ultrasonic sensors 18 may be disposed to be spaced apart from each other along the mounting surface 181b.

The ultrasonic guide unit 181 has side surface portions 181c formed to be inclined at both side ends of the mounting surface 181b. The side surface portions 181c are formed so as to be inclined to increase a distance between the side surface portions 181c as they go toward the front side on the mounting surface 181b. The side surface portions 181c are configured to limit a lateral propagation angle of ultrasonic waves generated from the ultrasonic sensor 18. As a result, it may be possible to prevent ultrasonic waves from being spread unnecessarily wide.

A battery may be mounted inside the inner body 20. An electrical component mounted on the outer cover 10, such as an ultrasonic sensor 18, is electrically connected to the battery to receive power from the battery.

To this end, a withdrawal hole 191 for drawing a wire from the front to the outside of the inner body 20 may be formed at a front side of the inner body 20. A rubber stopper 19 for fixing the wire drawn out through the withdrawal hole 191 may be provided in the withdrawal hole 191. A wire protection cover 192 protruding forward and upward from a front surface of the inner body 20 may be provided. A front surface of the lower portion of the wire protection cover 192 may clogged and opened upward. The wire drawn out through the withdrawal hole 191 may connect the battery to the ultrasonic sensor 18 or the like.

Figure 25:
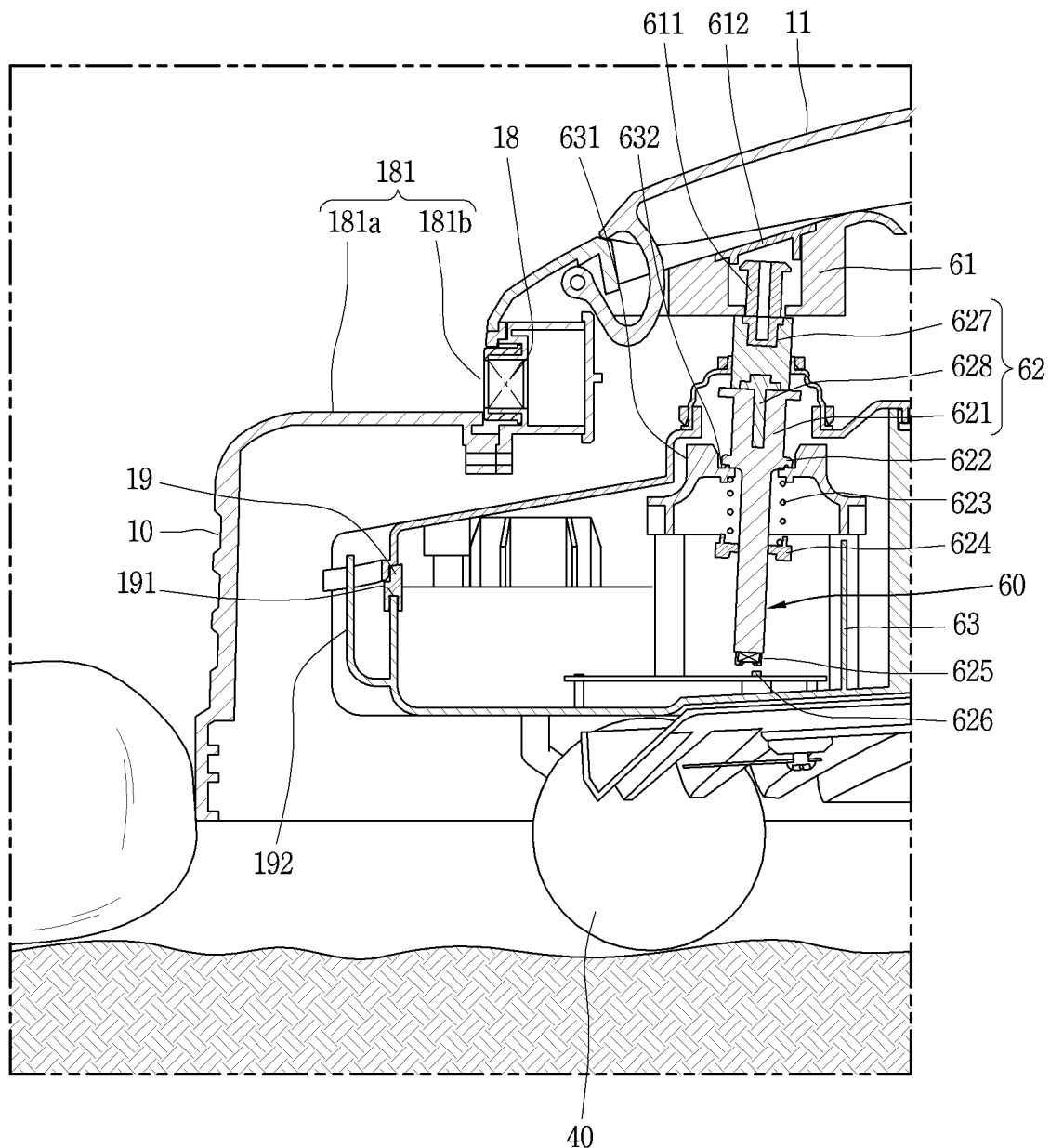
FIG. 25 is a conceptual view illustrating a state in which a sensor of the joystick bumper senses a collision when the outer cover of FIG. 24 collides with an obstacle.
Figure 26:
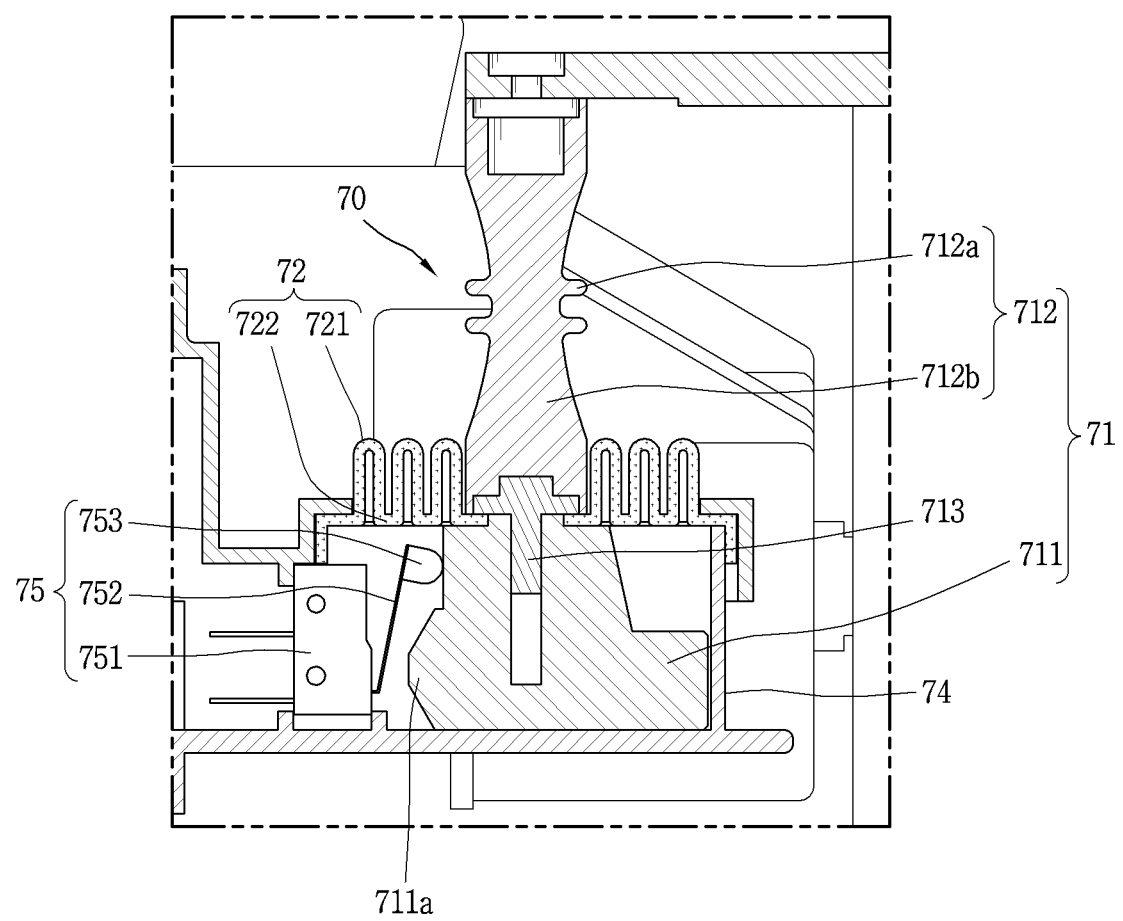
FIG. 26 is a cross-sectional view illustrating in detail a shape of the support portion in FIG. 24.

FIG. 24 is an exploded view illustrating a coupling relation among a joystick bumper 60, a support portion, and an outer cover 10 according to the present disclosure, and FIG. 25 is a conceptual view illustrating a state in which a sensor of the joystick bumper 60 senses a collision when the outer cover 10 of FIG. 24 collides with an obstacle, and FIG. 26 is a cross-sectional view illustrating in detail a shape of the support portion in FIG. 24.

Since the configuration of the joystick bumper 60 according to the present disclosure is also illustrated in FIG. 23, FIG. 23 will be also referred to together.

The joystick bumper 60 is a device that detects when the outer cover 10 moves in all directions due to collision with an obstacle, and restores the outer cover 10 to its original position when the obstacle is released from an impact of the obstacle.

An upper end portion of the joystick bumper 60 may be connected to the outer cover 10, and thus the upper end portion of the joystick bumper 60 may also move in all directions when the outer cover 10 moves in all directions. A joystick bumper fastening portion 61 may protrude from a lower surface of the outer cover 10 to face the joystick bumper 60. The joystick bumper fastening portion 61 may be provided at a front side of the cover coupling portion 12 of the outer cover 10.

A fastening hole is formed through an inside of the joystick bumper fastening portion 61 and a fastening member 611 such as a bolt 55 may be inserted through the fastening hole. A hole cover 612 is detachably mounted on an upper portion of the joystick bumper fastening portion 61 to open and close the fastening hole. The fastening member 611 is inserted through the fastening hole and fastened to an upper end portion of the joystick bumper 60 to couple the outer cover 10 to an upper end portion of the joystick bump.

The joystick bumper 60 may be vertically mounted on a front upper portion of the inner body 20. An upper portion of the joystick bumper 60 may be exposed to an upper portion of the inner body 20, and a lower portion of the joystick bumper 60 may be mounted inside the inner body 20.

The joystick bumper 60 includes a bumper body 62 formed in a rod shape. The bumper body 62 may include a first bumper portion 621 and a second bumper portion 627. The second bumper portion 627 may be coupled to an upper portion of the first bumper portion 621 through a coupling member 628. A first coupling groove may be formed on an upper portion of the first bumper portion 621, and a second coupling groove may be formed on a lower portion of the second bumper portion 627. An upper portion of the coupling member 628 is fitted and coupled to the second coupling groove, and a lower portion of the coupling member 628 is fitted and coupled to the first coupling groove to couple the first bumper portion 621 to the second bumper portion 627. The second bumper portion 627 may be coupled to the joystick bumper coupling portion 61 of the outer cover 10 by the coupling member 611.

The inner body 20 may be separated into an inner body main body 201 and an inner body cover 202. The inner body cover 201 is disposed to cover an upper portion of the main body of the inner body 20, and the inner body main body 201 and the inner body cover are coupled to each other at edges thereof. The joystick bumper 60 may be mounted on the inner body cover 202.

The joystick bumper 60 has an elastic member 629. The elastic member 629 may be formed in a conical shape to surround an upper portion of the first bumper portion 621 and a lower portion of the second bumper portion 627. The elastic member 629 may have a bellows shape in which the area becomes narrower toward the upward direction. A wrinkled portion of the elastic member 629 is formed on an inclined surface having a conical shape. An upper end portion of the elastic member 629 is coupled to the second bumper portion 627 and a lower end portion of the elastic member 629 is coupled to an upper portion of the inner body cover 202 so that the joystick bumper 60 can be elastically supported to move in all directions (forward, backward, leftward and rightward directions). The elastic member 629 may be made of a rubber material to alleviate an impact of the joystick bumper 60 transmitted from the outer cover 10 upon collision between the outer cover 10 and the obstacle.

A joystick bumper frame 63 is provided within the inner body 201. A joystick bumper mounting portion 631 is coupled to an upper portion of the joystick bumper frame 63. The joystick bumper 60 has a joint protrusion portion 622 formed along a circumferential direction on an outer circumferential surface of the first bumper. The joystick bumper mounting portion 631 may be provided with a protrusion receiving groove 632 therein to surround the joint protrusion portion 622, and the joint protrusion portion 622 may be received and coupled to the protrusion receiving groove 632 to rotate an upper end portion and a lower end portion of the joystick bumper 60, respectively, around the joint protrusion portion 622 in the joystick bumper mounting portion 631.

The joystick bumper 60 includes a spring 623. The spring 623 may be mounted under the joint protrusion portion 622. An upper end portion of the spring 623 is coupled to the protrusion receiving groove 632, and a lower portion of the spring 623 is mounted on the first bumper portion 621 to extend in a downward direction along the first bumper portion 621 from the protrusion receiving groove 632. A spring seat 624 may be provided at a lower portion of the first bumper portion 621. The spring seat 624 may be configured to surround part of the first bumper portion 621 in a ring shape, and a lower end portion of the spring 623 may be coupled to the spring seat 624.

An upper end portion of the spring 623 may be fixed to the inner body 20, and a lower end portion of the spring 623 is coupled to a lower portion of the joystick bumper 60 to restore the joystick bumper 60 to an original position by an elastic force of the spring 623. For example, when an impact due to an obstacle is released from the outer cover 10 due to the backward movement of the lawn mower robot in a state where the outer cover 10 moves backward with respect to the inner body 20 due to a collision with the obstacle, the joystick bumper 60 may be returned to its original position by an elastic force of the spring 623.

The joystick bumper 60 includes a sensing unit 625. The sensing unit 625 may be provided below the joystick bumper 60. The sensing unit 625 may be a magnet. The sensing unit 625 may be mounted on at a lower end portion of the first bumper.

A hall sensor 626 is provided on an inner bottom surface of the inner body 20. The hall sensor 626 is disposed to face the sensing portion 625. The hall sensor 626 may be installed on a bottom surface of the joystick bumper frame 63 inside the inner body 20. The hall sensor 626 may sense whether or not the outer cover 10 collides with an obstacle by interaction with the sensing unit 625. For example, when the outer cover 10 moves backward with respect to the inner body 20 due to a collision with an obstacle, an upper end portion of the joystick bumper 60 connected to the outer cover 10 rotates backward, and a lower end portion of the joystick bumper 60 rotates forward. As the lower end portion of the joystick bumper 60 rotates, the sensing unit 625 is separated from the hall sensor, and the hall sensor 626 may sense that the outer cover 10 has collided with an obstacle. The control unit 80 may sense a collision between the outer cover 10 and the obstacle through the hall sensor, and control the drive motor 521 of the wheel 50 to move the lawn mower robot back from the obstacle. As a result, the lawn mower robot may move around the obstacle.

FIG. 26 is a cross-sectional view illustrating a coupling relationship of the support portion in FIG. 24.

FIG. 24 illustrates a state in which the outer cover 10 and the support portion 70 of the present disclosure are connected.

The outer cover 10 may be mounted on an upper portion of the inner body 20 to be movable in the up-down direction and in all directions (forward, backward, leftward and rightward directions) The outer cover 10 may be supported by a support portion 70 provided at both the front and rear sides of the inner body 20.

A plurality of support portions 70 are coupled to a lower surface of the outer cover 10. A coupling plate 73 for coupling with the support portion 70 is provided at both the front and rear sides of a lower surface of the outer cover 10, respectively. The coupling plate 73 may be fixed to the outer cover 10 by a fixing bracket 731. The coupling portion may extend in a horizontal direction from the fixing bracket 731 and be disposed on the same plane as the fixing bracket 731. The fixing bracket 731 may be fixed to the outer cover 10 by welding or by a fastening means such as a bolt 55 or the like to fix the coupling plate 73. The coupling plate 73 may be coupled to the support portion 70 by the bolt 55.

Each of the plurality of support portions 70 is formed in a rod shape, and disposed perpendicular to the inner body 20. The inner body 20 has a support portion receiving portion 74 for receiving the support portion 70.

The support portion 70 includes a support body 71 coupled to the outer cover 10. The support portion body 71 may be formed of an elastic material such as rubber or the like to mitigate an impact transmitted from the outer cover 10. The support portion body 71 may include a first bumper portion 711 and a second bumper portion 712. A first coupling groove is formed at an upper portion of the first supporting portion 711 and a second coupling groove is formed at a lower portion of the second supporting portion 712, and an upper portion of the coupling member 713 may inserted into the first coupling groove, and a lower portion of the coupling member 713 may be inserted and coupled to the second coupling groove. The second supporting portion 712 is coupled to an upper portion of the first supporting portion 711 by the coupling member 713.

A wrinkled portion 72 may be provided on an outer circumferential surface of the support portion body 71. An inner side of the wrinkled portion 72 surrounds an outer circumferential surface of the support portion body 71 and is coupled to the support portion body 71, and an outer side thereof is coupled to the support portion receiving portion 74 of the inner body. The wrinkled portion 72 is extended from an outer circumferential surface of the support body 71 along a radial direction. The wrinkled portion 72 may include a plurality of bent portions 721 formed along a circumferential direction in a cross-sectional shape of "∩" and a connecting portion 722 connecting the plurality of bent portions 721. The plurality of bent portions 721 may be radially spaced apart and arranged in an overlapping manner. Due to the structure of the wrinkled portion 72, the support portion body 71 is supported to be movable in a vertical direction and in all directions (forward, backward, leftward and rightward directions) to support the outer cover 10 at four points. An inner end portion of the wrinkled portion 72 may be fastened to the first support portion 711 by the coupling member 713. At this time, the coupling member 713 may be a bolt.

The first support portion 711 has a protrusion portion 711a at one lateral side thereof to sense whether or not the outer cover 10 is raised. When the outer cover 10 is lifted in the air, the support portion body 71 coupled to the outer cover 10 may move in an upward direction.

A rising restriction protrusion 711b is provided at the other side of the first support portion 711. The rising restricting protrusion portion 711b is received in the support portion receiving portion 74 to restrict the support portion from rising beyond a predetermined height.

A plurality of reinforcing protrusions 712a may be formed on an outer circumferential surface of the second support portion 712 along a circumferential direction to reinforce the strength of the second support portion 712.

A concave portion is formed in a concave manner on an outer circumferential surface of the second support portion 712 along a circumferential direction with a gentle curvature so that the second support portion 712 can be bent in all directions. The reinforcing protrusions 712a may be disposed at a central portion of the concave portion 712b in a vertical direction. The concave portion 712b may be formed to have a smaller cross-sectional area from the upper and lower ends toward the reinforcing protrusion 712a.

A cover lifting detection sensor 75 is provided within the support portion receiving portion 74. The cover lifting detection sensor 75 includes a switch body 751 and a switch operation lever 752.

The switch body 751 is formed in a rectangular parallelepiped shape having a flat shape, and a contact is provided inside the switch body 751. One side of the switch operation lever 752 is fixed to one side corner portion of the switch body 751 so that one side thereof can be interlocked with a contact inside the switch body 751, and the other side thereof is separated from the switch body 751 and inclined in a direction facing the protrusion portion 711a of the first support portion 711. A contact portion 753 is formed to protrude from an end of the switch operation lever 752. The contact portion 753 is disposed on an up-and-down movement line of the protruding portion 711a.

The protrusion portion 711a of the first support portion 711 moves in an upward direction when the support portion body 71 is raised by lifting the outer cover 10. At this time, the switch operation lever 752 may be pressurized toward the switch body 751 and an internal contact of the switch body 751 may be turned on while the contact portion 753 is brought into contact with the protrusion portion 711a, and thus the cover lifting detection sensor 75 may be able to sense that the outer cover 10 is in the lifted state. When the outer cover 10 is lowered to its original position, the protrusion portion 711a of the first support portion 711 is lowered. At this time, the switch operation lever 752 moves to its original position, and the internal contact of the switch body 751 is turned off while the contact portion 753 is separated from the protrusion portion 711a, thereby sensing that the cover is in an unlifted state. When the outer cover 10 senses that the outer cover 10 is in a lifted state, the control unit 80 controls the drive motor 521 of the wheel 50 and the drive motor 30 of the blade 31 to stop the driving of the wheel 50 and the blade 31.

In addition, a tilt detection sensor 76 may be provided in consideration of an emergency situation. The tilt detection sensor 76 may be mounted on the inner body 20 to sense an inclination of the inner body 20. The control unit 80 may stop the operation of the lawn mower robot when it receives a sensing signal from the tilt detection sensor 76 and the tilt angle exceeds a predetermined tilt angle. For example, the lawn mower robot may be turned over when the uphill slope gradient is steep, and thus the control unit 80 may sense it in advance to stop the operation of the wheel 50 and the blade 31.

Figure 27:
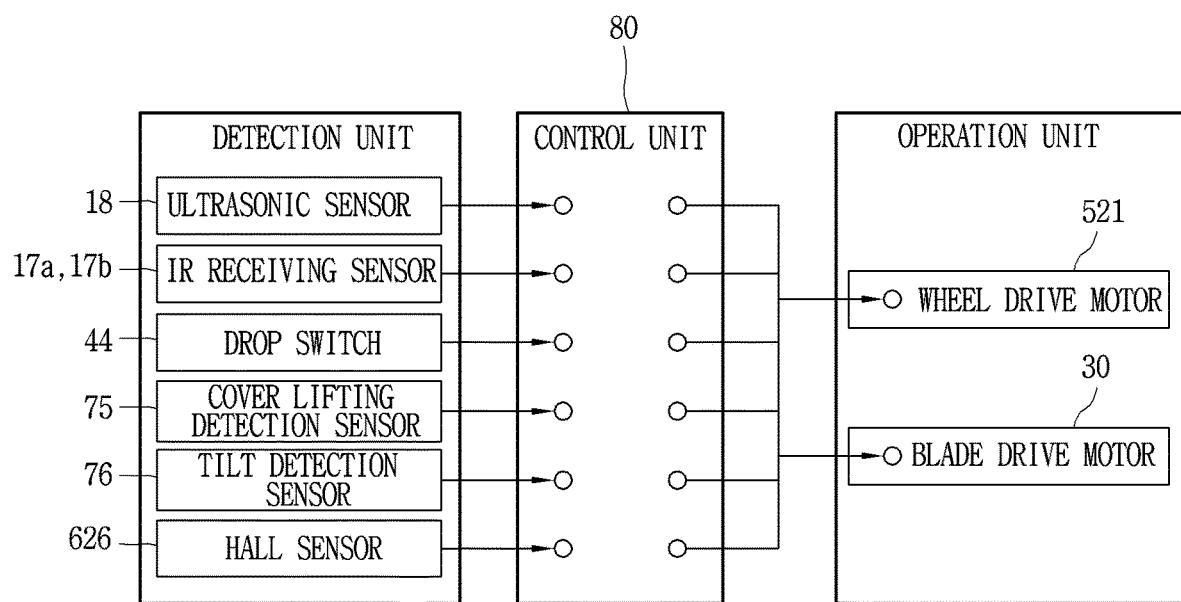
FIG. 27 is a block diagram illustrating a control flow of a lawn mower robot according to the present disclosure.

FIG. 27 is a block diagram illustrating a control flow of a lawn mower robot according to the present disclosure.

The control unit (controller) 80 of the present disclosure controls the overall operation of the lawn mower robot. In particular, in consideration of safety, the control unit 80 may receive a detection signal from the detection unit to control the operation unit, that is, the drive motor for the wheel 50 and the drive motor 30 for the blade 31.

The detection unit includes an ultrasonic sensor 18 and an IR receiving sensor mounted on the outer cover 10, and a drop switch 44, a cover lifting detection sensor 75, a tilt detection sensor 76, and a hall sensor mounted on the inner body 20.

The ultrasonic sensor 18 is mounted in front of the outer cover 10 to sense an obstacle above a predetermined height.

The IR receiving sensors are respectively positioned on the front and rear surfaces of the outer cover 10 to sense the position of the charging stand 90.

The drop switch 44 senses whether the caster 40 is floating in the air and lowered with respect to the inner body 20.

The cover lifting detection sensor 75 senses whether the outer cover 10 is lifted or not.

The tilt detection sensor 76 senses an inclination of the inner body 20.

The hall sensor 626 senses whether or not the outer cover 10 and the obstacle collide with each other by interaction with a magnet.

Accordingly, an object of the present disclosure is to provide a lawn mower robot having an ultrasonic sensor capable of sensing an obstacle located in front of an outer cover in advance to prevent collision with the obstacle in advance.

Furthermore, another object of the present disclosure is to provide a lawn mower robot for preventing ultrasonic waves from sensing an obstacle below a predetermined height from the ground.

Still another object of the present disclosure is to provide a lawn mower robot having a joystick bumper and a support portion capable of minimizing an impact on an outer cover due to collision of an outer cover with an obstacle.

In order to accomplish the foregoing objectives of the present disclosure, a lawn mower robot according to the present disclosure may include an inner body provided with casters and wheels for moving on both sides, respectively; a plurality of blades rotatably provided on a bottom surface of the inner body to cut grass; a drive motor mounted on the wheels, respectively, to independently drive the wheels; an outer cover configured to surround an outer side of the inner body, and mounted on the inner body to be movable in forward, backward, leftward and rightward directions with respect to the inner body when colliding with an obstacle; a plurality of ultrasonic sensors provided at a front side of the outer cover to sense an obstacle in front; and an ultrasonic guide unit formed to be recessed rearward from a front end portion of the outer cover so as to restrict a downward propagation angle of ultrasonic waves generated from the ultrasonic sensors.

According to an example associated with the present disclosure, the ultrasonic guide unit may include a horizontal surface horizontally formed at a predetermined height from an upper end of a front end portion of the outer cover; a mounting surface formed to intersect in an upward direction at a rear end of the horizontal surface, in which the plurality of ultrasonic sensors are embedded; and side surface portions formed at both side end portions of the mounting surface to be inclined laterally.

According to an example associated with the present disclosure, the plurality of ultrasonic sensors may be spaced apart from each other along the mounting surface.

According to an example associated with the present disclosure, the lawn mower robot may further include a control unit configured to control the drive motor according to a signal sensed from the plurality of ultrasonic sensors to reduce a driving speed of the wheels.

According to an example associated with the present disclosure, the lawn mower robot may further include a height adjusting lever rotatably mounted on an upper portion of the inner body to adjust a height of the blade; a first opening portion formed at an upper portion of the outer cover to communicate with the height adjusting lever; and a first cover hinge-coupled to the outer cover to open and close the first opening portion.

According to an example associated with the present disclosure, the lawn mower robot may further include a display and a keypad provided at a rear upper portion of the inner body; a second opening portion formed at a rear upper portion of the outer cover to communicate with the display and the keypad; and a second cover hinge-coupled to the outer cover to open and close the second opening portion.

According to an example associated with the present disclosure, the lawn mower robot may further include an emergency stop switch disposed between the first cover and the second cover, the emergency stop switch being mounted on the outer cover to be pressed in an emergency so as to stop the wheels.

According to an example associated with the present disclosure, the lawn mower robot may further include a carry handle both sides of which extend in an upwardly inclined manner from a upper front side of both side surfaces of the outer cover, respectively, to a rear side thereof to protrude toward a rear upper portion of the outer cover, and a rear end portion of which is formed in a closed curved surface shape.

According to an example associated with the present disclosure, charging terminals for charging a battery may be provided at an upper portion of one side of the outer cover.

According to an example associated with the present disclosure, IR receiving windows for transmitting infrared rays for sensing a charging stand may be provided on front and rear surfaces of the outer cover, respectively, and the IR receiving window provided on the front surface of the outer cover may be disposed at a position close to the changing stand with respect to a longitudinal center line of the outer cover.

A lawn mower robot according to an example associated with an another aspect of the present disclosure may include an inner body provided with casters and wheels for moving on both sides, respectively; a plurality of blades rotatably provided on a bottom surface of the inner body to cut grass; a drive motor mounted on the wheels, respectively, to independently drive the wheels; an outer cover configured to surround an outer side of the inner body, and mounted on the inner body to be movable in all directions with respect to the inner body when colliding with an obstacle; support portions provided at front and rear upper portions of the inner body, respectively, to elastically support the outer cover; and a joystick bumper provided on the inner body to be rotatable in all directions, and an upper side thereof is coupled to the outer cover, and a sensing unit for sensing whether or not the outer cover collides with an obstacle is provided at a lower side thereof.

According to an example associated with an another aspect of the present disclosure, the joystick bumper may include a bumper body formed in a rod-shaped structure disposed in an elongated manner in a vertical direction; a joint protrusion portion formed to protrude from an intermediate portion of the bumper body to be rotatable in all directions with respect to the inner body and mounted on a joint bumper mounting portion within the inner body; and a spring one side of which is coupled to the joint bumper mounting portion within inner body, and the other side of which is mounted on the bumper body to extend downward from the joint protrusion portion so as to return the bumper body to its original position.

According to an example associated with an another aspect of the present disclosure, the sensing unit may be a magnet, and may include a hall sensor provided within the inner body to sense a collision between the outer cover and an obstacle by interaction with the sensing unit.

According to an example associated with an another aspect of the present disclosure, the joystick bumper may further include an elastic member having an upper end portion coupled to an upper portion of the joystick bumper to surround the joystick bumper, and a lower end portion coupled to the inner body to elastically support the joystick bumper, and the elastic member may be formed in a bellows shape to have a smaller area as it goes toward an upward direction.

According to an example associated with an another aspect of the present disclosure, the support portion may include a support portion body coupled to the outer cover and made of an elastic material to elastically support the outer cover; and a wrinkle portion coupled to an outer circumferential surface of the support portion body and wrinkled along a radial direction from the support portion body to support the support portion body so as to be movable up and down and in all directions.

According to an example associated with an another aspect of the present disclosure, the lawn mower robot may include a battery mounted within the inner body; and a display mounted on an upper rear side of the inner body and a keypad for operation.

According to the present disclosure configured as described above, the following effects can be obtained.

First, a plurality of ultrasonic sensors may be provided in front of the outer cover to sense an obstacle in front of the outer cover using the ultrasonic sensors to reduce the driving speed, thereby preventing collision with the obstacle.

Second, the propagation angle of ultrasonic waves generated from the ultrasonic sensors may be restricted to a predetermined height or more, thereby preventing the lawn mower robot from decelerating or stopping in front of grass below a predetermined height because the grass being cut is erroneously recognized as an obstacle.

Third, the inner body may be provided with a joystick bumper rotatable in all directions, an upper portion of the outer cover may be coupled to the joystick bumper, and a sensing unit and a hall sensor may be provided below the joystick bumper, thereby sensing whether or not the outer cover collides with an obstacle.

Fourth, an elastic member may be provided in the middle of the joystick bumper, thereby mitigating an impact of the outer cover at the time of collision between the outer cover and the obstacle.

Fifth, the joystick bumper may be provided with a joint protrusion portion in the middle of the joystick bumper to allow an upper end portion and a lower end portion of the joystick bumper to be rotatable in all directions, and a spring may be provided at a lower portion of the joint protrusion portion, thereby restoring the outer cover released from an original position to its original position.

Sixth, a support portion for supporting the outer cover at both front and rear sides of the inner body, and a wrinkle portion for elastically supporting the support portion to be movable up and down and in all directions may be provided, thereby mitigating an impact caused by collision of the outer cover with an obstacle and restoring the outer cover to its original position.

Seventh, an emergency stop switch may be provided at a rear side of the outer cover to allow the operator to stop the operation of the lawn mower robot by pressing the emergency stop switch safely from behind the lawn mower robot in an emergency.

Eighth, a carry handle may be formed to protrude from a upper portion to a rear side of the outer cover, and a blade may be directed to an outside of the user while carrying the carry handle, thereby having an advantage in terms of safety.

Ninth, an IR receiving window may be formed on the front and rear surfaces of the outer cover, thereby having an advantage for easily sensing the position of the charging stand.

Tenth, a first cover for covering the height adjusting lever and a second cover for covering the display and the keypad may be respectively provided at an upper portion of the outer cover, thereby preventing rainwater or the like from being gathered or accumulated.

The foregoing description has merely described the technical concept of the present disclosure in an exemplary manner, and it will be apparent to those skilled in this art that various changes, modifications and substitutions may be made thereto without departing from the gist of the present disclosure.

Furthermore, it should be noted that the embodiments and accompanying drawings disclosed in the present disclosure are only illustrative and not limitative to the technical concept of the present disclosure, and the scope of the technical concept of the present disclosure is not limited by those embodiments.

The scope protected by the present disclosure should be construed by the accompanying claims, and all the technical concept within the equivalent scope of the invention should be construed to be included in the scope of the right of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lawn mower robot, comprising:
   an inner body provided with casters near a front side of the inner body and wheels near a rear side of the inner body;
   a plurality of blades rotatably provided on a bottom surface of the inner body to cut grass;
   a drive motor mounted on each of the wheels to independently drive the wheels;
   an outer cover configured to surround the inner body and mounted on the inner body to be movable relative to the inner body, the outer cover being configured to move forward, backward, left and right with respect to the inner body when the outer cover of the lawn mover robot collides with an obstacle; and
   support portions provided at front and rear upper portions of the inner body, to elastically support the outer cover,
   wherein the support portions include:
      a support portion body coupled to the outer cover and made of an elastic material to elastically support the outer cover; and
      a plurality of curved portions coupled to an outer circumferential surface of the support portion body and curved along a radial direction from the support portion body to support the support portion body so as to be movable in lateral and vertical directions,
      wherein the plurality of curved portions are aligned in the radial direction along an outer circumferential surface of the support portion body.

2. The lawn mower robot of claim 1, further comprising:
   a plurality of ultrasonic sensors provided at a front side of the outer cover to sense an obstacle in front of the lawn mower robot; and
   an ultrasonic guide unit formed on the outer cover and configured to restrict a downward propagation angle of ultrasonic waves generated from the ultrasonic sensors.

3. The lawn mower robot of claim 2, wherein the ultrasonic guide unit includes:
   a lateral surface provided at a predetermined height above an upper end of a front end portion of the outer cover and extending from the front end of the outer cover toward a rear end of the outer cover;
   a mounting surface provided a prescribed distance from the front end portion of the outer cover and extending upward from the lateral surface, wherein the plurality of ultrasonic sensors are embedded in the mounting surface; and
   a side surface formed at both lateral sides of the mounting surface and angled laterally.

4. The lawn mower robot of claim 3, wherein the lateral surface is angled relative to the ground such that a propagation angle of the ultrasonic waves in a vertical direction is greater than a prescribed minimum angle to restrict downward propagation of the ultrasonic waves.

5. The lawn mower robot of claim 3, wherein the plurality of ultrasonic sensors are spaced apart from each other along the mounting surface.

6. The lawn mower robot of claim 2, further comprising:
   a control unit configured to control the drive motors according to a signal sensed from the plurality of ultrasonic sensors to reduce a driving speed of the wheels.

7. The lawn mower robot of claim 1, further comprising:
   a height adjusting lever rotatably mounted on the upper portion of the inner body to adjust a height of the blade;
   a first opening formed at an upper portion of the outer cover in communication with the height adjusting lever; and
   a first cover that is hinge-coupled to the outer cover to open and close the first opening.

8. The lawn mower robot of claim 7, further comprising:
   a display and a keypad provided at a rear upper portion of the inner body;
   a second opening formed at a rear upper portion of the outer cover in communication with the display and the keypad; and
   a second cover that is hinge-coupled to the outer cover to open and close the second opening.

9. The lawn mower robot of claim 8, further comprising:
   an emergency stop switch disposed between the first cover and the second cover, the emergency stop switch being mounted on the outer cover and configured to be pressed in an emergency to stop the wheels.

10. The lawn mower robot of claim 1, further comprising:
    a carry handle, both sides of which extend in an upwardly inclined manner from an upper front side of side surfaces of the outer cover to a rear side of the outer cover to protrude toward a rear upper portion of the outer cover, and having a rear end portion which is formed in a closed curved surface shape.

11. The lawn mower robot of claim 1, further comprising charging terminals for charging a battery are provided at an upper portion of one side of the outer cover.

12. The lawn mower robot of claim 1, further comprising IR receiving windows and IR sensors configured to sense a charging stand, the IR receiving windows being provided on front and rear surfaces of the outer cover, wherein the IR receiving window provided on the front surface of the outer cover is disposed at a position closer to the charging stand with respect to a longitudinal center line of the outer cover than the IR receiving window provided on the rear surface.

13. The lawn mower robot of claim 1, further comprising:
    a joystick bumper provided on the inner body to be rotatable in all directions, wherein an upper side of the joystick bumper is coupled to the outer cover and a sensing unit configured to sense collisions between the outer cover and an obstacle is provided at a lower side of the joystick bumper.

14. The lawn mower robot of claim 13, wherein the joystick bumper includes:
    a bumper body formed in a rod-shaped structure disposed to extend in a vertical direction;
    a joint protrusion portion that protrudes from an intermediate portion of the bumper body and configured to allow movement of the upper side of the bumper body in lateral directions with respect to the inner body and mounted on a joint bumper mounting portion within the inner body; and
    a spring having one side coupled to the joint bumper mounting portion within inner body and another side mounted on the bumper body to extend downward from the joint protrusion portion and configured to return the bumper body to an original position.

15. The lawn mower robot of claim 14, wherein the sensing unit includes a magnet provided on a bottom end of the bumper body and a hall sensor provided within the inner body and configured to sense a collision between the outer cover and an obstacle by interaction with the magnet.

16. The lawn mower robot of claim 15, wherein when the bumper body is in the original position, the magnet is positioned over the hall sensor, and when the bumper body is moved from the original position, the magnet is moved away from the hall sensor and the wheels are controlled to stop rotating.

17. The lawn mower robot of claim 13, wherein the joystick bumper includes an elastic member having an upper end portion coupled to an upper portion of the joystick bumper to surround the joystick bumper, and a lower end portion coupled to the inner body to elastically support the joystick bumper, wherein the elastic member is formed in a bellows shape in which a width of the elastic member gradually decreases in an upward direction.

18. The lawn mower robot of claim 1, further comprising:
a battery mounted within the inner body; and
a display and a keypad mounted on an upper rear side of the inner body.

19. A lawn mower robot, comprising:
an inner body;
an outer body to cover the inner body;
support portions provided at front and rear upper portions of the inner body to elastically support the outer body;
casters provided near a front side of the inner body;
wheels provided near a rear side of the inner body;
a plurality of blades rotatably provided on a bottom surface of the inner body to cut grass;
a plurality of drive motors that drive the wheels and the blades;
a plurality of sensors configured to sense an obstacle in a path of the lawn mower robot, to sense a collision between the outer body and the obstacle, and to sense a position of a charging station relative to the lawn mower robot; and
a controller to automatically control the wheels and the blades to stop rotating based on sensed information from the plurality of sensors, wherein the support portions include:
a support portion body coupled to the outer body and made of an elastic material to elastically support the outer body; and
a plurality of curved portions coupled to an outer circumferential surface of the support portion body and curved along a radial direction from the support portion body to support the support portion body so as to be movable in lateral and vertical directions,
wherein the plurality of curved portions are aligned in the radial direction on an outer circumferential surface of the support portion body.

20. The law mower robot of claim 1, wherein the plurality of curved portions form an accordion shape.

* * * * *